US 8,897,306 B2

(12) United States Patent
Hayashi et al.

(10) Patent No.: US 8,897,306 B2
(45) Date of Patent: Nov. 25, 2014

(54) PATH MANAGEMENT CONTROL METHOD, PATH MANAGEMENT CONTROL PROGRAM, PATH MANAGEMENT CONTROLLER AND PATH MANAGEMENT CONTROL SYSTEM

(75) Inventors: Rie Hayashi, Tokyo (JP); Kaori Shimizu, Tokyo (JP); Ichiro Inoue, Tokyo (JP); Shigeo Urushidani, Tokyo (JP)

(73) Assignees: Nippon Telegraph and Telephone Corporation, Tokyo (JP); Inter-University Research Institute Corporation Research Organization of Information and Systems, Tokyo (JP)

( * ) Notice: Subject to any disclaimer, the term of this patent is extended or adjusted under 35 U.S.C. 154(b) by 612 days.

(21) Appl. No.: 12/672,294

(22) PCT Filed: Aug. 21, 2008

(86) PCT No.: PCT/JP2008/064938
§ 371 (c)(1),
(2), (4) Date: Feb. 5, 2010

(87) PCT Pub. No.: WO2009/025329
PCT Pub. Date: Feb. 26, 2009

(65) Prior Publication Data
US 2011/0292949 A1 Dec. 1, 2011

(30) Foreign Application Priority Data
Aug. 22, 2007 (JP) ................................ 2007-216254

(51) Int. Cl.
*H04L 12/28* (2006.01)
(Continued)

(52) U.S. Cl.
CPC ............ *H04L 12/5695* (2013.01); *H04L 45/22* (2013.01); *H04L 47/745* (2013.01);
(Continued)

(58) Field of Classification Search
None
See application file for complete search history.

(56) References Cited

U.S. PATENT DOCUMENTS

| 7,242,679 B1 * | 7/2007 | Cortez et al. .................. 370/351 |
| 2004/0073650 A1 * | 4/2004 | Nakamura .................... 709/223 |

(Continued)

FOREIGN PATENT DOCUMENTS

| JP | 2002-314591 | 10/2002 |
| JP | 2004-112693 | 4/2004 |

(Continued)

OTHER PUBLICATIONS

European Search Report 08827583.9 dated Jul. 20, 2010.

(Continued)

*Primary Examiner* — Faruk Hamza
*Assistant Examiner* — Thinh Tran
(74) *Attorney, Agent, or Firm* — Squire Patton Boggs (US) LLP

(57) ABSTRACT

The path management controller 1 refers to resource information 131 including reservation statuses of working paths and advance reserved paths that are set in every link, so as to calculate a route for setting a new path and set this path in this calculated route. If the route for setting this new path cannot be obtained (1) because of a shortage of residual bandwidth of a link of interest, the path management controller 1 refers to the resource reservation information 131 of working paths and advance reserved paths and calculates an alternative route for another existing path used in the link of interest, and moves this path to the calculated alternative route. On the other hand, if the route for setting this new path cannot be obtained (2) because there is no continuous bandwidth sufficient for setting this new path in the link of interest, the path management controller 1 refers to the resource reservation information regarding working paths and advance reserved paths in the link of interest in the resource information 131, so as to execute the time slot rearrangement.

19 Claims, 14 Drawing Sheets

(51) Int. Cl.
    *G01R 31/08*     (2006.01)
    *G06F 15/173*     (2006.01)
    *H04L 12/54*     (2013.01)
    *H04L 12/707*     (2013.01)
    *H04L 12/911*     (2013.01)
    *H04L 12/729*     (2013.01)
    *H04L 12/701*     (2013.01)

(52) U.S. Cl.
    CPC ........... *H04L 47/728* (2013.01); *H04L 45/125* (2013.01); *H04L 45/00* (2013.01); *H04L 47/748* (2013.01); *H04L 47/826* (2013.01)
    USPC ................... 370/395.4; 370/237; 370/395.21; 370/395.32; 709/223; 709/225; 709/226

(56) References Cited

U.S. PATENT DOCUMENTS

| | | | | |
|---|---|---|---|---|
| 2004/0205206 | A1* | 10/2004 | Naik et al. | 709/230 |
| 2005/0262232 | A1* | 11/2005 | Cuervo et al. | 709/223 |
| 2006/0239271 | A1 | 10/2006 | Khasnabish et al. | |
| 2008/0123533 | A1* | 5/2008 | Vasseur et al. | 370/238 |
| 2008/0239958 | A1* | 10/2008 | Murray et al. | 370/235 |
| 2008/0259954 | A1* | 10/2008 | Sahni et al. | 370/468 |

FOREIGN PATENT DOCUMENTS

| | | |
|---|---|---|
| JP | 2005-217838 | 8/2005 |
| JP | 2005-269377 | 9/2005 |

OTHER PUBLICATIONS

International Search Report Corresponding to International Application No. PCT/JP2008/064938 filed Aug. 21, 2008.

"Toward Automated Provisioning of Advance Reservation Service in Next-Generation Optical Internet," Jun Zheng et al., IEEE Communications Magazine, Nov. 2006, pp. 68-74.

"Resource Reservation in Advance for Content On-demand Services," Dirk Hetzer et al., Networks 2006, 6 pages.

* cited by examiner

FIG. 3

131 Resource Information

1312 Resource Reservation Information

Link ID = 1

| Time1 | Residual Bandwidth=XX |
|---|---|
| Time Slot No. | Path ID |
| 1 | |
| 2 | ee |
| 3 | ee |
| 4 | ee |
| 5 | bb |
| ⋮ | ⋮ |

Link ID = 2

| Time1 | Residual Bandwidth=XX |
|---|---|
| Time Slot No. | Path ID |
| 1 | |
| 2 | ee |
| 3 | ee |
| 4 | ee |
| 5 | bb |
| ⋮ | ⋮ |

1311 Link Information

| Link ID | Bandwidth | A-End Node ID | A-End Node IF ID | Z-End Node ID | Z-End Node IF ID | Link Cost |
|---|---|---|---|---|---|---|
| 1 | BB | DD | EE | FF | GG | AA |
| 2 | ... | ... | ... | ... | ... | ... |

FIG. 4

132 Path Information

| Path ID | Source Node ID | Source Node IF ID | Destination Node ID | Destination Node IF ID | Pass-through Link ID List | Bandwidth |
|---|---|---|---|---|---|---|
| 1 | ii | jj | kk | ℓℓ | 1, 2, ... | nn |
| 2 | ... | ... | ... | ... | ... | ... |

FIG. 5

133 Route Information

Path ID = hh

| | Segment ID=1 | | Segment ID=2 | | | Segment ID=3 | | |
|---|---|---|---|---|---|---|---|---|
| Candidate Route ID | Pass-through Link ID List | Link Cost | Candidate Route ID | Pass-through Link ID List | Link Cost | Candidate Route ID | Pass-through Link ID List | Link Cost |
| 1 | 1, 2, 3 | 2 | 1 | 4, 2, 6 | 3 | 1 | 7, 8, 9 | 5 |
| 2 | 1, 3, 2 | 3 | 2 | 4, 7, 6 | 4 | 2 | 12, 10, 11 | 7 |
| ⋮ | ⋮ | ⋮ | ⋮ | ⋮ | ⋮ | | | |
| | | | 4 | 4, 7, 8 | 6 | | | |
| 5 | 1, 5, 3 | 5 | | | | | | |

134 Path Reservation Information

| Reservation ID | Start Time Of Use | End Time Of Use | Path ID | Bandwidth |
|---|---|---|---|---|
| aa | bb | cc | hh | ff |
| ... | ... | ... | ... | ... |

(1) Rearrangement Execution Reference Value = $\dfrac{\text{Available Bandwidth (25v)}}{\text{Entire Bandwidth}}$ = 0.46

(2) Rearrangement Execution Reference Value = $\dfrac{\text{Available Bandwidth (20v)}}{\text{Entire Bandwidth}}$ = 0.83

PATH MANAGEMENT CONTROL METHOD, PATH MANAGEMENT CONTROL PROGRAM, PATH MANAGEMENT CONTROLLER AND PATH MANAGEMENT CONTROL SYSTEM

BACKGROUND OF THE INVENTION

1. Field of the Invention

The present invention relates to a path management control technique.

2. Description of the Related Art

Recently, there have been suggested various network bandwidth advance reservation services for a user to securely obtain bandwidth of a network, and also for a network service provider to utilize resources of a network. There is disclosed in the following non-patent document 1 a method of how to handle a problem that such an advance reservation request is failure or denied. There is disclosed in the following non-patent document 2 a technique of adjusting schedules of such an advance reservation request, taking account of prediction of a traffic tendency and a network state.

[Non-patent Document 1]: Jun Zheng, et. al., "Toward Automated Provisioning of Advance Reservation Service in Next-Generation Optical Internet," IEEE Communications Magazine, November 2006.

[Non-patent Document 2]: Dirk Hetzer, Ilka Miloucheva, and Karl Jonas, "Resource Reservation in Advance for content On-demand Services," NETWORKS 2006.

However, the technique disclosed in the non-patent document 1 makes a user to change a content of his or her request so that his or her bandwidth reservation will be accepted. The technique disclosed in the non-patent document 2 does not consider how to handle a case in which a user cannot make an advance bandwidth reservation as the user desires.

The present invention has an object to solve the above problems by providing a path management control for facilitating a user's advance bandwidth reservation (setting of an advance reserved path) as the user desires.

SUMMARY OF THE INVENTION

In order to address the above problems, the invention as set forth in the claim 1 provides a path management controlling method using a path management controller including:

an input/output unit for controlling input/output of various data;

a storage unit for storing (1) route information including identification information regarding every link used for a path that connects nodes, (2) in association with identification information of every link, resource information including identification information of advance reserved paths and working paths that use the link of interest and a residual bandwidth of the link of interest in chronological order, (3) in association with identification information of every working path, path information including identification of links and a bandwidth used in the working path of interest, and (4) in association with identification information of every advance reserved path, path reservation information including a bandwidth used in the advance reserved path of interest and a period of use of the advance reserved path of interest;

a route calculating section for calculating a route for the path with reference to the route information, the resource information, the path information and the path reservation information; and a path setting section for setting a path between each pair of nodes in a network, based on the path reservation information or a path setting request for setting a path, which is input via the input/output unit.

The path management controlling method allows the path management controller to execute steps of:

via the input/output unit, receiving a path setting request for setting the advance reserved path, which includes a bandwidth and a period of use requested for the advance reserved path;

with reference to the route information and the resource information, calculating a route to be used for the advance reserved path;

with reference to a residual bandwidth in association with every link at each time included in the resource information, determining whether or not there is any link that cannot secure a bandwidth during the period of use as requested in the path setting request, among links used in the route for the advance reserved path;

when determining that there is any link that cannot secure a bandwidth during the period of use as requested in the path setting request, among the links of the route for setting the advance reserved path, with reference to the route information and the resource information, calculating an alternative route for a path that uses the link that cannot secure the bandwidth as requested in the path setting request, among paths registered in the path information and the path reservation information; and updating the resource information and the path reservation information with the calculated alternative route and the route for the advance reserved path.

The invention as set forth in the claim 18 provides a path management controller including:

an input/output unit for controlling input/output of various data; a storage unit for storing (1) route information including identification information regarding every link used for a path that connects nodes, (2) in association with identification information of every link, resource information including identification information of advance reserved paths and working paths that use the link of interest and a residual bandwidth of the link of interest in chronological order, (3) in association with identification information of every working path, path information including identification of links and a bandwidth used in the working path of interest, and (4) in association with identification information of every advance reserved path, path reservation information including a bandwidth used in the advance reserved path of interest and a period of use of the advance reserved path of interest;

a route calculating section for via the input/output unit, receiving a path setting request for setting the advance reserved path, which includes a bandwidth and a period of use requested for the advance reserved path, calculating a route to be used for the advance reserved path with reference to the route information and the resource information, with reference to a residual bandwidth in association with every link at each time included in the resource information, if determining that there is any link that cannot secure a bandwidth during the period of use as requested in the path setting request, among links used in the route for the advance reserved path, with reference to the route information and the resource information, calculating an alternative route for a path that uses the link that cannot secure the bandwidth requested in the path setting request, among paths registered in the path information and the path reservation information, and updating the resource information and the path reservation information with the calculated alternative route and route for the advance reserved path; and a path setting section for setting the advance reserved path having a bandwidth as represented in the path reservation information between each pair of nodes in a network during a period of use as represented in the path reservation information.

The invention as set forth in the claim 19 provides a path management system including the path management controller as claimed in the claim 18; and nodes between two of which a path is set in response to a path setting instruction sent from this path management controller.

In such a configuration, this path management controller can refer to reservation statuses of working paths and advance reserved paths that are set in every link in the resource information, and calculate an advance reserved path. If there is any link in which a bandwidth for setting the advance reserved path cannot be secured, the path management controller refers to reservation statuses of working paths and advance reserved paths in another link, and calculate an alternative route for another path used in this another link, and then execute the route rearrangement. This can lower the probability that a path setting request for setting an advance reserved path is denied. This means that it can be easier to set an advance reserved path as a user desires.

Based on the path management control method of the claim 1, the invention of the claim 2 has a feature that, when setting the path, the path management control method allows the path management controller to execute a further step of instructing each node to execute an operation of adding or deleting a path, or changing a bandwidth of the path in an uninterruptible manner.

According to such a method, when the path management controller instructs an execution of adding or deleting a path, or changing a bandwidth of a path, there occurs no packet loss, so as to prevent deterioration of quality of the network service.

Based on the path management control method of either the claim 1 or 2, the invention as set forth in the claim 3 has a feature that the resource information further includes information regarding an original bandwidth of every link, and if there are plural links that cannot secure the bandwidth during the period of use as requested in the path setting request, among the links in the calculated route for setting the advance reserved path, the method allows the path management controller to execute further steps of:

when calculating the alternative route for the path, receiving a selection input to select preferentially executing this alternative route calculation in the plural links in the order from a greater original bandwidth, or preferentially executing this alternative route calculation for the plural links in the order from a smaller original bandwidth; and when calculating the alternative route for the path, based on this received selection input, determining from which link among the plural links the alternative route for the path in the link of interest is preferentially calculated.

According to such a method, for example, when the path management controller receives a selection input to select preferentially executing this alternative route calculation of the links in the order from a greater original bandwidth, the possibility of securing a larger bandwidth can be higher through this route rearrangement, and even if a relatively larger bandwidth is requested for the advance reserved path, the probability that a path setting request for setting an advance reserved path is denied can be lowered.

Based on the path management controlling method of claim 3, the invention as set forth in the claim 4 has a feature that, if there are plural paths to be calculated for the alternative route in the link of interest, the path management controlling method allows the path management controller to execute further steps of:

receiving at least one of selection inputs to preferentially calculate the alternative route for the path among the plural paths to be calculated (1) in the order from a greater bandwidth or from a smaller bandwidth, and (2) in the order from a longer period of use;

based on the received selection input, with reference to the bandwidth and the period of use of the path of interest included in the path information and the path reservation information, determining from which path among the plural paths to be calculated, the alternative route for the path is preferentially calculated.

According to such a method, when this path management controller selects a path having a larger bandwidth as a target path for the route rearrangement, a larger bandwidth in the link of interest can be secured, so that the probability to deny a path setting request for an advance reserved path requiring a larger bandwidth can be lower. On the other hand, when this path management controller selects a path having a smaller bandwidth as a target path for the route rearrangement, an alternative route for this path can be more easily found out. When the path management controller selects a path having a longer period of use as a target path for the route rearrangement, a bandwidth having a longer period of use can be secured, so that the probability to deny a path setting request for an advance reserved path requiring a longer period of use can be lower. Alternatively, when the path management controller selects a path having a shorter period of use as a target path for the route rearrangement, an alternative route for this path can be more easily found out, so that the probability to deny a path setting request for an advance reserved path can be lower.

Based on the path management controlling method of either one of the claims 1 to 4, the invention as set forth in the claim 5 has a feature that, when calculating the alternative route for the path, the path management controlling method allows the path management controller to execute a further step of executing the alternative route calculation, excluding links that do not have a residual bandwidth sufficient for the bandwidth of the path of interest, among links included in the resource information.

According to such a method, this path management controller can avoid to allocate an alternative route to a link that having a residual bandwidth less than the bandwidth requested for the path.

Based on the path management controlling method of either one of the claims 1 to 5, the invention as set forth in the claim 6 has a feature that the path reservation information further includes information regarding a plurality of the advance reserved paths to be set in a predetermined time cycle, and the method allows the path management controller to execute a further step of:

if the path to be calculated for the alternative route calculation is included in the plurality of the advance reserved paths, calculating the alternative route such that all the plurality of the advance reserved paths pass a same route, and updating the path reservation information and the resource information with the calculated alternative route.

According to such a method, when setting an advance reserved path as a new path, for example if the route rearrangement is required for setting the advance reserved path in a predetermined time cycle such as a 24-hour path to be set on the first day of every month (scheduled advance reserved path), the path management controller can execute the route rearrangement for each advance reserved path at each time cycle. Since each scheduled advance reserved path at each time cycle has the same route after the route rearrangement, so that the quality of service can be maintained in such an occasion.

Based on the path management controlling method of either one of the claims 1 to 6, the invention as set forth in the claim 7 has a feature that the resource information includes identification information regarding time slots of the link of interest allocated to the working paths and the advance reserved paths, and the method allows the path management controller to execute further steps of:

referring to a residual bandwidth in association with every link at each time included in the resource information, and if determining that the link of interest has a residual bandwidth greater than or equal to a bandwidth during the period of use as requested in the path setting request, but has no continuous available bandwidth greater than or equal to a bandwidth as requested in the path setting request;

executing a time slot rearrangement to change a time slot allocated to the working path or the advance reserved path in the link of interest, so as to secure in this link of interest the continuous available bandwidth greater than or equal to a bandwidth as requested in the path setting request;

allocating the time slot having the secured continuous available bandwidth to the advance reserved path; and updating the resource information with the identification information regarding the time slot allocated to the advance reserved path as well as the identification information regarding the time slot of the working path or the advance reserved path, which has been changed with this time slot rearrangement.

According to such a method, if the link of interest has no residual bandwidth greater than or equal to the bandwidth required for setting the advance reserved path, the path management controller executes the route rearrangement as set forth in the claims 1 to 6; and if the link of interest has a residual bandwidth greater than or equal to the bandwidth required for setting the advance reserved path, but has no continuous available bandwidth greater than or equal to the bandwidth required for setting the advance reserved path, the path management controller executes the time slot rearrangement as set forth in the claim 7. In such a method, the necessity of executing the route rearrangement can be reduced at a minimum level. When executing the time slot rearrangement, it can be realized to execute the time slot rearrangement while considering the reservation status of every time slot of the working paths and the advance reserved paths in the resource information.

Based on the path management controlling method of the claim 7, the invention as set forth in the claim 8 has a feature that the path management controlling method allows the path management controller to execute further steps of:

executing a time slot rearrangement to change a time slot allocated to the working path or the advance reserved path in the link of interest in a predetermined time cycle by widening an available bandwidth between two paths in the link of interest, or between one end and one path in the link of interest; and updating the resource information with the identification information regarding the time slot of the working path or the advance reserved path, which has been changed with this time slot rearrangement.

According to such a method, the path management controller executes the time slot rearrangement in a predetermined time cycle so as to always secure a continuous available bandwidth in the link of interest. Therefore, it is possible to prepare an environment that enables the path management controller to set the path immediately when receiving a path setting request for the advance reserved path (or immediate-use path).

Based on the path management controlling method of either the claims 7 and 8, the invention as set forth in the claim 9 has a feature that the path management controlling method allows the path management controller to execute a further step of executing the time slot rearrangement to secure an available bandwidth in the link of interest, by preferentially widening a larger available bandwidth either between two paths in the link of interest or between one end and one path in the link of interest.

According to such a method, the path management controller can secure a continuous available bandwidth sufficient for setting the advance reserved path through the partial time slot rearrangement.

Based on the path management controlling method of either one of the claims 7 to 9, the invention as set forth in the claim 10 has a feature that the path management controlling method allows the path management controller to execute further steps of referring to a residual bandwidth in association with every link at each time included in the resource information; and if determining that the link of interest has a residual bandwidth greater than or equal to a bandwidth during the period of use as requested in the path setting request, but has no continuous available bandwidth greater than or equal to a bandwidth as requested in the path setting request, and at least either of the period of use and the bandwidth as requested in the path setting request exceeds a predetermined threshold, executing the time slot rearrangement in the link of interest.

According to such a method, the path management controller executes the time slot rearrangement only when necessary, so that the necessity of executing the time slot rearrangement can be reduced at a minimum level.

Based on the path management controlling method of either one of the claims 7 to 10, the invention as set forth in the claim 11 has a feature that, when executing the time slot rearrangement to secure a continuous available bandwidth greater than or equal to a bandwidth as requested in the path setting request, allows the path management controller to execute a further step of consolidating the available bandwidth between two paths in the link of interest or the available bandwidth between one end and one path in the link of interest.

According to such a method, the path management controller can secure one available bandwidth by consolidating available bandwidths dispersed across the link of interest.

Based on the path management controlling method of the claim 11, the invention as set forth in the claim 12 has a feature that the path management controlling method allows the path management controller to execute further steps of:

referring to a residual bandwidth in association with every link at each time included in the resource information as well as a bandwidth allocated to each time slot; and if determining that the link of interest has a residual bandwidth greater than or equal to a bandwidth during the period of use as requested in the path setting request, but has no continuous available bandwidth greater than or equal to a bandwidth as requested in the path setting request, and the available bandwidth of the link of interest exceeds a predetermined threshold, executing the time slot rearrangement in the link of interest.

According to such a method, the path management controller can reduce the necessity of executing the time slot rearrangement at a minimum level.

Based on the path management controlling method of either one of the claims 7 to 12, the invention as set forth in the claim 13 has a feature that the path management controlling method allows the path management controller to execute a further step of, if there are plural links to be calculated for the time slot rearrangement, executing the time slot rearrangement in each of the links at a time.

According to such a method, the path management controller can reduce time required to complete the time slot rearrangement.

Based on the path management controlling method of the claim 1, the invention as set forth in the claim 14 has a feature that the resource information of the path management controlling method further includes identification information regarding every time slot constituting the link of interest, and the method allows the path management controller to execute a further step of, when setting the advance reserved path, referring to the resource information, and preferentially selecting one from available time slots in the link of interest as a destination for setting the advance reserved path, in the order from a smallest identification number or from a greatest period of use, so as to set the advance reserved path into this selected time slot.

According to such a method, the path management controller firstly sets the advance reserved path into an available time slot at an end of the link of interest, so that the path management controller can more easily secure a continuous available bandwidth after the first setting of the advance reserved path.

Based on the path management controlling method of the claim 14, the invention as set forth in the claim 15 has a feature that, when selecting one from available time slots of the link of interest as a destination for setting the advance reserved path, the path management controlling method allows the path management controller to execute a further step of referring to the resource information, and selecting one from available time slots having a smaller or greater identification number thereof as the period of use of the advance reserved path is longer.

According to such a method, the path management controller preferentially sets the advance reserved path having a longer period of preferentially into an available time slot closer to an end of the link of interest, so that the path management controller can more easily secure a continuous available bandwidth when setting a further advance reserved path after this setting of the advance reserved path.

Based on the path management controlling method of either one of the claims 1 to 15, the invention as set forth in the claim 16 has a feature that the path setting request for setting the advance reserved path is a path setting request for setting an immediate-use path to be used immediately.

According to such a method, the path management controller can more easily set an immediate-use path as a user requests, as well.

The invention as set forth in the claim 17 provides a path management control program that instructs a path management controller including a computer to execute the steps of the path management control method of either one of the claims 1 to 16.

According to such a method, it is possible to allow a general-purpose computer to execute the path management control method.

Based on the path management controller of the claim 18, the invention as set forth in the claim 20 has a feature that the path management controller is used in a network including plural domains each of which comprises the path management controller and a node, wherein a path is set between this node and another node in response to a path setting instruction sent from the path management controller, and the storage unit further includes:

domain connection information including identification information regarding pass-through domains through which a path having this node as a destination thereof passes when setting this path, in association with identification information of every node; and pass-through domain information including identification information regarding pass-through domains through which the path passes, in association with identification information regarding every advance reserved path and every working path, and the path management controller further includes:

a pass-through domain determining section that, when receiving a path setting request for setting the advance reserved path, determines pass-through domains through which the advance reserved path passes when setting this advance reserved path, with reference to identification information regarding the node serving as the destination of the advance reserved path and the domain connection information; and an rearrangement path informing section that sends the path setting request for setting the advance reserved path, including identification information regarding the pass-through domains to other path management controllers of the determined pass-through domains, when receiving the path setting request for setting the advance reserved path from one of the other path management controllers, instructs the route calculating section of its own path management controller to calculate a route for the advance reserved path in its own domain, based on results of the route calculation by the route calculating section, if there is still any link that cannot secure a bandwidth during the period of use, as requested in the path setting request, and there is a path in which the alternative route is calculated among paths that use this link, determines domains through which this path passes, with reference to the pass-through domain information, and informs a path ID of this path to the path management controllers of the determined pass-through domains.

According to such a path management controller, in a case of setting a new path across plural domains and requiring the rearrangement in an advance reserved path or a working path, it is possible to inform path management controllers of domains through which the target path for the rearrangement passes that the rearrangement will be executed. This means that it is possible to inform in advance the path management controllers of the domains likely to be influenced by the communication interruption due to the rearrangement that the rearrangement will be executed.

According to the present invention, a probability that a path setting request for setting an advance reserved path (or immediate-use path) is denied can be lower.

BRIEF DESCRIPTION OF THE DRAWINGS

FIG. 3 shows an example of the link information and the resource reservation information of the resource information of FIG. 2.

FIG. 4 shows an example of the path information of FIG. 2.

FIG. 5 shows an example of the route information of FIG. 2.

DESCRIPTIONS OF NUMERICAL REFERENCES

Figure 1:
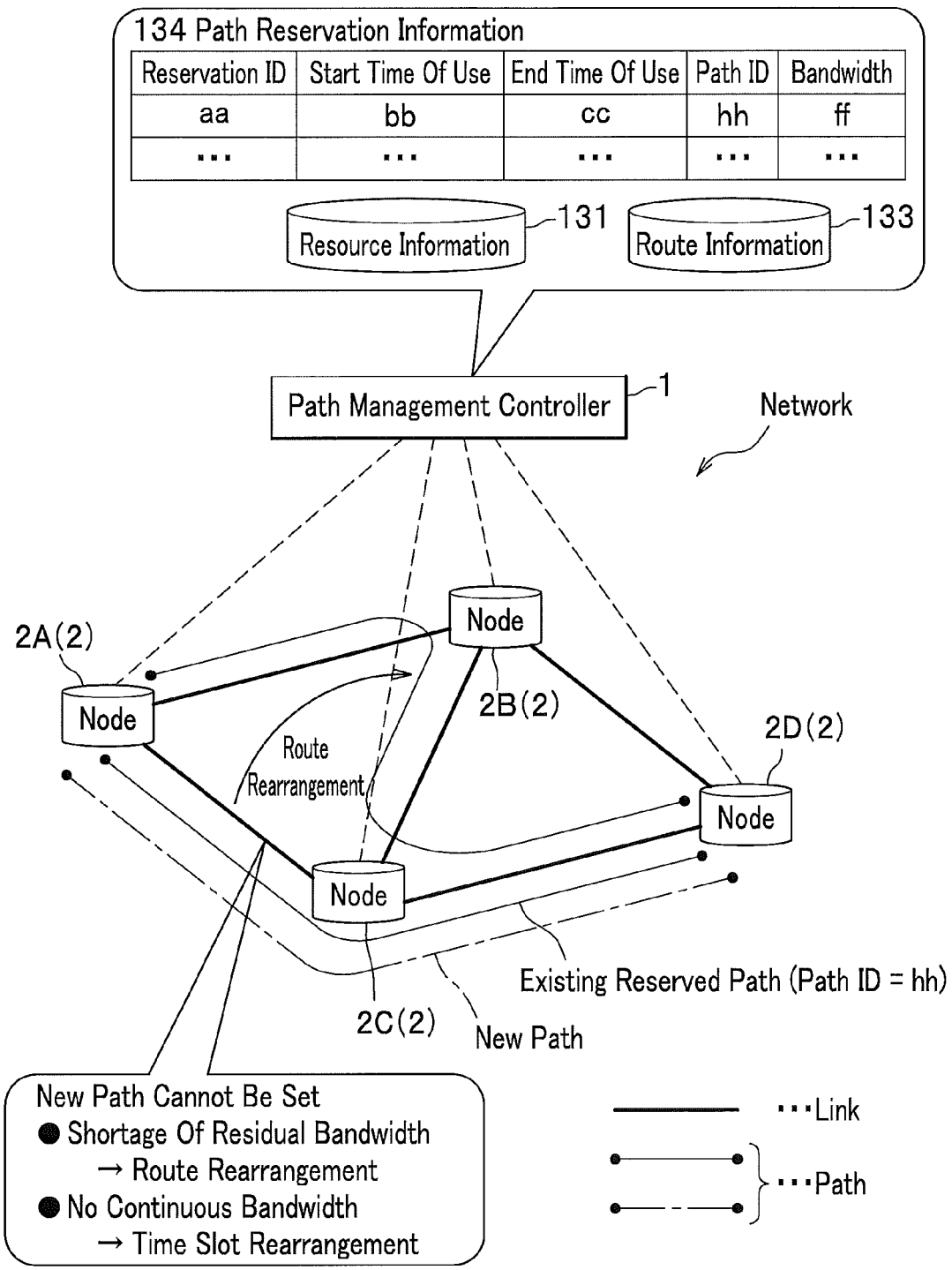
FIG. 1 is a schematic diagram of a configuration of a network including a path management controller according to the embodiment of the present invention.

1. Path management controller
2. (2A, 2B, 2C, 2D) Node
11. Input/output unit
12. Processing unit
13. Storage unit
14. Communicating unit
121. Route calculating section
122. Path setting section
123. Pass-through domain determining section
124. Setting request transmitting section
125. Rearrangement path informing section
131. Resource information
132. Path information
133. Route information
134. Path reservation information
135. Domain connection information
136. Passing-through domain information
1311. Link information
1312. Resource reservation information

DETAILED DESCRIPTION OF THE PREFERRED EMBODIMENT

With reference to the drawings, descriptions will be provided on a preferred embodiment of the present invention (hereinafter also referred to as "the present embodiment"). FIG. 1 is a schematic diagram of a configuration of a network including a path management controller according to the embodiment of the present invention. As shown in FIG. 1, the network includes nodes 2 (nodes 2A, 2B, 2C, 2D) and the path management controller 1. The nodes 2 and the path management controller 1 are connected to be communicable with each other.

The path management controller 1 stores resource information 131, route information 133 and path reservation information 134, etc. of the network. When receiving a path setting request from an external device or the like, the path management controller 1 performs a route calculation with reference to the above various information, and instructs nodes 2 located on the calculated route to perform a path setting.

Details of the resource information 131, the route information 133 and the path reservation information 134 will be described later on. The path reservation information 134 includes various data such as a start date of use (start time of use), an end date of use (end time of use), a path ID, bandwidth, etc. of every advance reserved path, as shown in FIG. 1. The resource information 131 includes not only resource information regarding each link in a current status but also resource information of each link in a future status. Specifically, the resource information 131 includes allocation states of working paths and advance reserved paths for every link. A working path denotes a path currently set and working in the network, and is registered in the path information 132. An advance reserved path denotes a path to be set in the network in a future time, and is registered in the path reservation information 134.

Based on the path reservation information 134, the path management controller 1 instructs each node 2 to do a path setting. When receiving this path setting instruction, the node 2 performs a signaling operation with other nodes 2 to do a path setting. Note that the path setting may be carried out in such a manner that a path is set directly between two of the nodes 2, or in such a manner that a logical path is set in a relatively lower layer than a layer of the network where the nodes 2 are located.

The network may be embodied by a line switching network such as a TDM (Time Division Multiplexing) and WDM (Wavelength Division Multiplexing) network, or an IP (Internet Protocol) network, an Ethernet (registered trademark), a MPLS (Multi-Protocol Label Switching) network. Every node 2 may be embodied by using a MPLS router for a MPLS network, a router for an IP network, or an optical cross-connect of an optical network, etc.

<Operation Outline>

With reference to FIG. 1, an operation outline of the path management controller 1 will be described hereinafter. The operation outline will be explained by using an example in which the path management controller 1 receives a path setting request for setting an advance reserved path as a new path, but the management controller 1 may receive a setting request for setting an immediate-use path (a path to be used immediately), instead.

The path management controller 1 receives a path setting request for setting a new path from a source node (node 2A) to a destination node (node 2D), sent from an external device such as an input device (not shown). This path setting request includes data regarding a bandwidth desired to be allocated to the new path and its period of use. With reference to the resource information 131 and the route information 133, etc., taking account of a resource allocation status for every link in the current and future time, the path management controller 1 performs a route calculation for setting this new path. Note that a route to be calculated means a shortest route from a source node to a destination node.

If the path management controller 1 determines that this new path cannot be set in the above calculated shortest route, the path management controller 1 performs the following processes.

Specifically, the path management controller 1 refers to the current and future resource allocation status of every link, included in the resource information 131, and if determining that this new path cannot be set (1) because of a shortage of residual bandwidth of a link of interest, the path management controller 1 performs the route calculation again so as to find an alternative route where an existing reserved path will be moved (i.e. performing a route arrangement). The path management controller 1 finds a route with the nodes 2A→2B→2C as an alternative route for moving this existing reserved path (a path having a path ID "hh") thereto, for example.

If determining that the new path cannot be set (2) because there is no continuous bandwidth sufficient for setting this new path; for example, if available slots in the link of interest are dispersed, the path management controller 1 changes (rearranges) the time slots allocated to the existing reserved path (the path having the path ID "hh"), so as to secure a continuous available bandwidth for setting the new path. This new path is then allocated to this secured continuous available bandwidth. If the path management controller 1 determines that this new path cannot be set even through the above mentioned route rearrangement or time slot rearrangement, the path management controller 1 denies the path setting request for setting this new path. Then, the path management controller 1 informs that this new path cannot be set. As described above, the path management controller 1 attempts to set a new path as close to as what is requested in a path setting request.

<Configuration of Path Management Controller>

Figure 2:
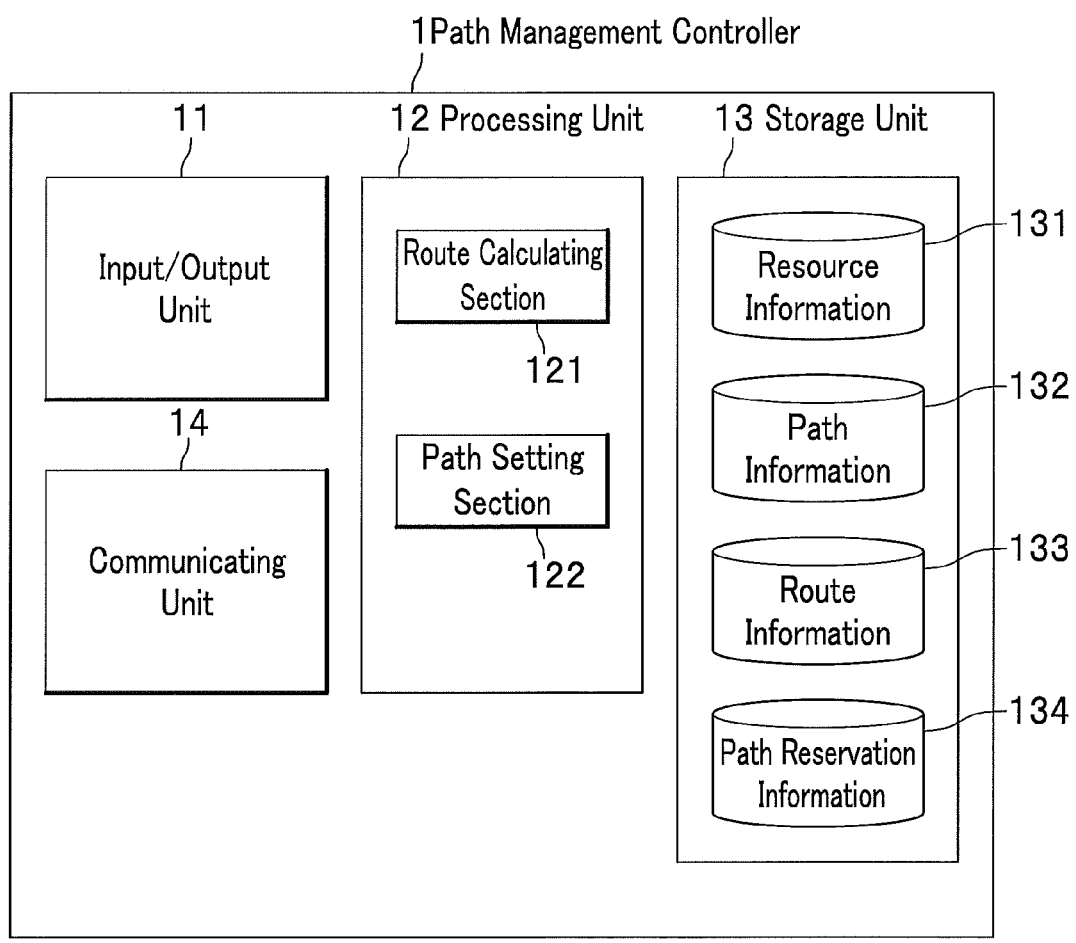
FIG. 2 is a block diagram of a configuration of the path management controller of FIG. 1.

With reference to FIG. 2, the configuration of the path management controller 1 will be described hereinafter. FIG. 2 is a block diagram of the configuration of the path management controller 1 of FIG. 1.

As shown in FIG. 2, the path management controller 1 includes an input/output unit 11, a processing unit 12, a storage unit 13 and a communicating unit 14.

The input/output unit 11 is an interface with an external device like an input device (not shown) such as a keyboard and a mouse, or an output device (not shown) such as a liquid crystal monitor. The input/output unit 11 outputs information input from the external device to the processing unit 12, and outputs information processed by the processing unit 12 to the external device. The input/output unit 11 mainly receives an input of a path setting request for setting a new path (an immediate-use path or an advance reserved path). In response to this setting request, the input/output unit 11 outputs a result of whether or not a route for this new path has been found out.

The processing unit 12 manages the entire control of the path management controller 1, and also controls the input/output unit 11, the communicating unit 14 and the storage unit 13, as well as processing information that is input.

The processing unit 12 includes a route calculating section 121 that calculates (searches for) a route from a source node to an destination node for setting a path thereto, and a path setting section 122 that outputs to each node 2 a path setting instruction to set a path in the calculated route.

With reference to the resource information 131 and the route information 133, etc., the route calculating section 121 calculates a route from a source node to a destination node. A dijkstra algorithm and a k-shortest path algorithm may be used for this route calculation. When receiving an input of identification information of a source node and a destination node (such as a node ID), the route calculating section 121 refers to information regarding a link cost for every link and topology information of the network (not shown) registered in the resource information 131, and then calculates a candidate route from this source node to this destination node and its link cost. Then, the route calculating section 121 registers the candidate route in the route information 133 in the order of link cost. The route calculating section 121 also puts a flag or the like to a route selected from candidate routes calculated in the above manner, as a route for setting the new path. Hence, when any start date of use included in the path reservation information 134 arrives, the path setting section 122 can refer to the route information 133 and can grasp in which route the new path should be set.

When the route calculating section 121 determines target links and a target path for the above route arrangement, the route calculating section 121 refers to the route information 133, and finds out a route (alternative route) as a destination of the determined target path in the target links for this route rearrangement. With reference to the path reservation information 134, the route calculating section 121 checks a bandwidth and a period of use (start date of use and end date of use) of the target path for the route arrangement, and also checks the resource reservation status of the found route, and then determines whether or not this found route can secure a period of use and a bandwidth for the target path. If this found route is determined to be able to secure the period of use and the bandwidth for the target path, this found route is selected as an alternative route as a destination where the target path is moved. Then, the resource information 131 is updated with data representing that the route of the target path is changed to the above alternative route. The resource information 131 is updated with data representing that the target path uses the alternative route in the same period of use and with the same bandwidth. The above selected alternative route is also recorded as a route used for the target path in the route information 133. The processes of the route calculating section 121 will be described in detail later on, with reference to a flow chart.

The above mentioned route calculation may be executed when the path management controller 1 receives a path setting request for setting an immediate-use path or an advance reserved path; or the route calculating section 121 calculates candidate routes in advance and registers them in the route information 133, and selects an appropriate route from these candidate routes if necessary.

The path setting section 122 sets a path in the network with reference to the path reservation information 134. Specifically, when a given start date of use in the path reservation information 134 arrives, the path setting section 122 sets on the network a path having a concerned bandwidth represented in said path reservation information 134. When a concerned end date of use of the path reservation information 134 arrives, the path setting section 122 ends this path setting. A route, which is used when the path setting section 122 sets a new path, is a route selected in the route information 133 as a route for setting the new path. When the path setting section 122 receives a path setting request for setting a path to be immediately used (immediate-use path), the route calculating section 121 first calculates a route for the immediate-use path, and then the path setting section 122 sets this path in the calculated route. Thereafter, the path setting section 122 records data regarding this set path (such as the source node ID, the destination node ID, the pass-through link list, bandwidth, etc.) in the path information 132. When instructing a node in the network to add or delete a path, or change a bandwidth of a path, the path setting section 122 also instructs the node to execute such an operation in an uninterruptible manner using a technique such as VCAT (Virtual Concatenation) and LCAS (Link Capacity Adjustment Scheme). Accordingly, quality of service provided through the path can be maintained.

A function of the processing unit 12 is embodied when the CPU (Central Processing Unit) of the path management controller 1 or the like executes a predetermined program stored on the storage unit 13.

The storage unit 13 stores also various data to which the processing unit 12 refers when executing a route calculation, a route rearrangement and a time slot rearrangement, etc, as well as storing various programs that embody the functions of the path management controller 1. The storage unit 13 also stores the resource information 131, the path information 132, the route information 133 and the path reservation information 134. The storage unit 13 stores topology information of the network as well (not shown). The topology information includes identification information of every node 2 located in the network and information regarding how the nodes 2 are connected with one another. Note that the topology information and the resource information 131 are updated with information that the path management controller 1 collects from each node 2 of the network. The storage unit 13 may be embodied by using a storage device such as a RAM (Random Access Memory), a flash memory or a HDD (Hard Disk Drive).

The resource information 131 includes data regarding links that connect the nodes 2 constituting the network, residual bandwidths of each link in a future and current time, path IDs of paths respectively accommodated in the links, etc. The resource information 131 includes link information 1311 and resource reservation information 1312.

FIG. 3 shows an example of the link information and the resource reservation information of the resource information of FIG. 2. In association with every link that constitutes the network, the link information 1311 includes identification information (link ID), a bandwidth (original bandwidth), an A-end node ID, an A-end node IF (interface) ID, a Z-end node ID, a Z-end node IF ID, a link cost, etc., as shown in FIG. 3. A value calculated based on a residual bandwidth of a link of interest may be used for a value of a link cost thereof, for example. An IP address or the like may be used for a node ID and a node IF ID, for example.

In association with every link ID, the resource reservation information 1312 includes a path ID of each working path and each advance reserved path which use a link of interest, and a residual bandwidth of the link of interest, in chronological order. As exemplified in FIG. 3, in association with every link ID, the resource reservation information 1312 includes a time slot No. (time slot number) of each time slot in a link of interest, a path ID of each path allocated to this time slot and a residual bandwidth of the link of interest, in chronological order. For example, the resource reservation information 1312 regarding the link ID="1" of FIG. 3 represents that a residual bandwidth is "XX" at Time "1" in this link, and also represents that no path is allocated to a time slot with the time slot No. "1". The information 1312 also represents that a path having a path ID "ee" is allocated to time slots with time slot No. "2" to "4" and a path having a path ID "bb" is allocated to a time slot with time slot No. "5". If every single time slot has a same bandwidth; for example, if a bandwidth of a single time slot is defined to be 155 Mbps, a bandwidth 155 Mbps× 3=465 Mbps is allocated to the path having the path ID "ee" accommodated in the link with the link ID "1".

In the resource reservation information 1312 of FIG. 3, the information regarding Time "1" shows resource reservation information at a current time, and information regarding Time "2" and thereafter shows resource reservation information at a future time. A time interval between Time "1" and Time "2", between Time "2" and Time "3", and so on, may be defined as desired, and all the time intervals may be the same as or different from one another.

The resource information 131 is referred to by the route calculating section 121 when this section 121 executes a route calculation or a time slot arrangement.

In association with every path ID of working paths, the path information 132 of FIG. 2 includes a link ID of every link and each bandwidth used for a working path of interest. FIG. 4 shows an example of path information of FIG. 2. In association with every path ID of working paths, the path information 132 represents a source node ID, a source node IF ID, a destination node ID, a destination node IF ID, a pass-through link ID list and a bandwidth, etc., as shown in FIG. 4.

Returning to the explanation of FIG. 2, for every path, the route information 133 represents a candidate route (pass-through link ID list) for a path of interest. FIG. 5 shows an example of the route information of FIG. 2. FIG. 5 exemplifies that, in association with every path ID and every segment into which a candidate route of interest is segmented, the route information 133 includes a link ID list constituting a candidate route for a segment of interest and a link cost for the segment of interest, etc. A combination of these candidate routes of every segment constitutes a candidate route for a path of interest. The candidate routes in each segment are ordered in ascendant (or descendant) order of the link cost.

In the example of the route information 133 of FIG. 5, a path having a path ID "hh" is segmented into three segments with the segment IDs "1" to "3" respectively, and the segment with the segment ID "1" has five candidate routes. The route information 133 also represents that the segment with the segment ID "2" has four candidate routes, and the segment with the segment ID "3" has two candidate routes. The route information 133 also represents that a candidate route for the path ID "hh" selected by the route calculating section 121 is a route constituted by the candidate route ID "1" in the segment ID "1", the candidate route ID "1" in the segment ID "2", and the candidate route ID "1" in the segment ID "3". The route information 133 is referred to by the route calculating section 121 when this section 121 executes the route calculation.

The path management controller 1 may execute a route calculation on the route calculating section 121 every time a route calculation is required, without having the route information 133.

Figures 6, 7:
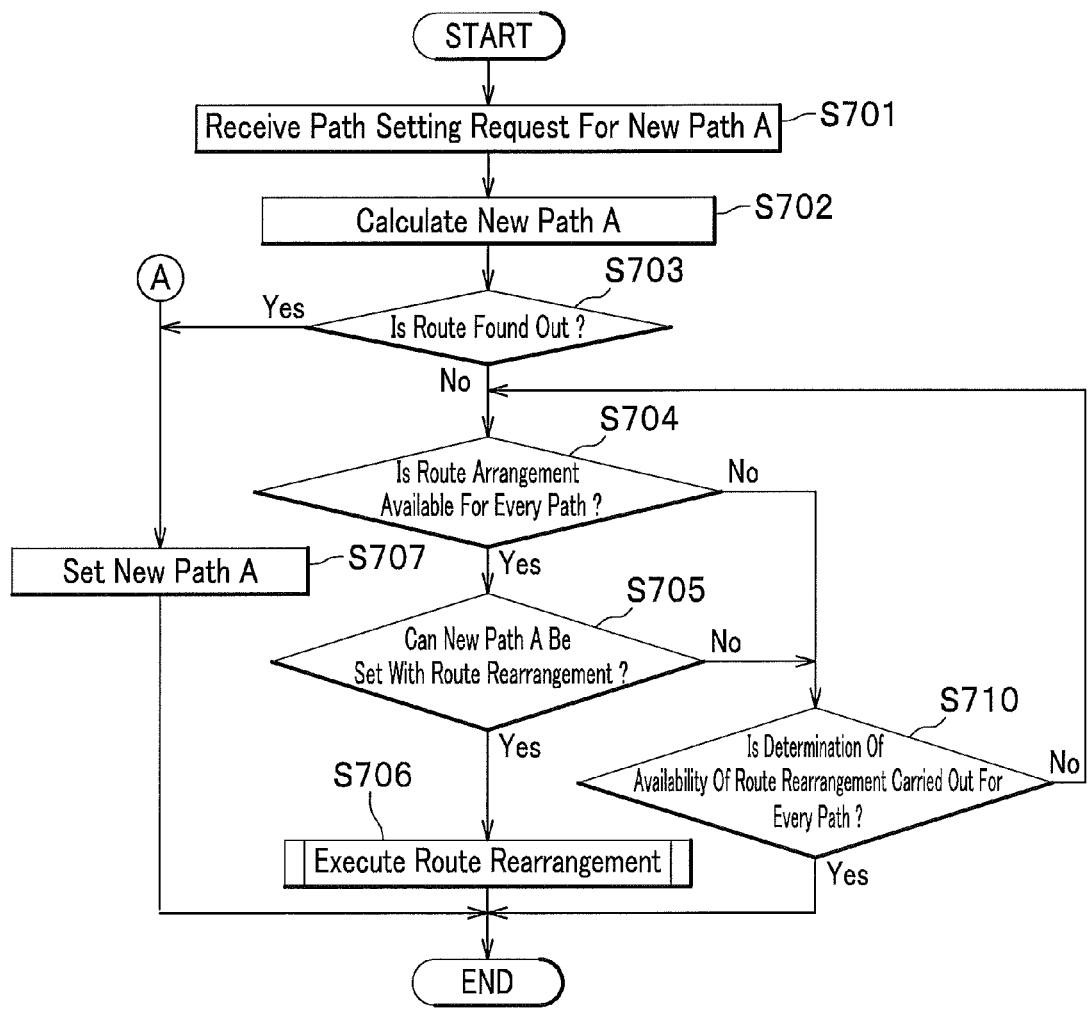
FIG. 6 shows an example of the path reservation information of FIG. 2.
FIG. 7 is a flow chart showing operation steps of the path management controller of FIG. 2.

Now, the explanation is returned with reference to FIG. 2 again. The path reservation information 134 includes information regarding a period of use as well as a path ID and bandwidth, etc. of an advance reserved path of interest. FIG. 6 shows an example of the path reservation information of FIG. 2. As shown in FIG. 6, in association with every reservation ID of advance reserved paths, the path reservation information 134 includes a start date of use and a end date of use (period of use), a path ID, and a bandwidth of an advance reserved path of interest. The path reservation information 134 is updated by the route calculating section 121 at the time when the advance reserved path is decided to be set after a path setting request for setting this advance reserved path is input. The path reservation information 134 is referred to by the path setting section 122 when this section 122 performs a path setting. The start date of use and the end date of use included in the path reservation information 134 may be a period of use in a predetermined time cycle, for example "a 24-hour path is to be set on the first day of every month." Only either of a start date of use and an end date of use may be specified. A user ID for a user of an advance reserved path of interest may also be included in this information 134.

The communicating unit 14 controls a communication interface with each node 2. The processing unit 12 obtains updated information regarding each node 2 and its links via the communicating unit 14, and outputs to each node 2 a path setting instruction to set a path by signaling.

<Operations of Path Management Controller>

With reference to FIG. 7, operation steps of the path management controller 1 will be described. FIG. 7 is a flow chart showing the operation steps of the path management controller 1 of FIG. 2. The path management controller 1 exemplified herein is assumed to obtain various information regarding each node 2 and its links, and updates the resource information 131 with the latest data before starting a calculation process described as follow.

The processing unit 12 of the path management controller 1 receives a path setting request for setting a new path A input from an external device or the like via the input/output unit 11 (S701). This new path A may be either one of an immediate-use path and an advance reserved path as mentioned above. This path setting request includes information regarding IDs for a source node and a destination node, a period of use, and a bandwidth of this new path A, etc. (requirements).

Next, the route calculating section 121 of the processing unit 12 performs a route calculation of the new path A (S702). This route calculation is carried out to find out an appropriate combination of links of a route from the source node to the destination node of the new path, which satisfies the requirement included in the setting request, based on the resource information 131 and the topology information. This calculated route as well as link costs thereof are registered in the route information 133.

If the route calculating section 121 finds out an appropriate route that satisfies the requirement included in the path setting request for setting the new path A (Yes at S703), the path setting section 122 sets the new path A in this calculated route (S707). Then, when the setting of the new path A is completed, information regarding this new path A is registered in the path information 132.

On the other hand, if the route calculating section 121 cannot find out a route that satisfies the requirement in the path setting request for setting the new path A (No at S703); that is, the route calculating section 121 determines that there is any link that cannot secure a bandwidth during the period of use, as requested in the path setting request, and the route calculating section 121 proceeds to S704. Then, the route calculating section 121 determines the availability of the route rearrangement for every path allocated to this link that cannot secure a bandwidth, referring to the resource information 131 (S704). Specifically, referring to the resource information 131 and assuming that a target path of interest for the route rearrangement is moved to an alternative route; the route calculating section 121 determines that the route rearrangement is available in this target path if this target path experiences no shortage of the residual bandwidth during its period of use in each link of this alternative route, or the route calculating section 121 determines that the route rearrangement is unavailable in this target path of interest if this target path experiences a shortage of the residual bandwidth during its period of use in either link of this alternative route. The target path to be rearranged for the route rearrangement may include a working path or an advance reserved path represented in the resource reservation information 1312 concerning the links of the target path.

If the route calculating section 121 determines that the route rearrangement is available in this target path allocated to the above links (Yes at S704), and also determines that the new path A can be set with this route rearrangement (Yes at S705), the route calculating section 121 executes this route rearrangement in this target path (S706). Then, the resource information 131 is updated with latest information regarding the route after being rearranged, and the process is completed. Details of the route rearrangement will be explained with reference to the flow charts later on.

On the other hand, if the route calculating section 121 determines that the route rearrangement is unavailable in this target path allocated to the above links (No at S704), or determines that the new path A cannot be set with this route rearrangement (No at S705), and the determination of availability of the route arrangement is already carried out for every path registered in the resource information 131 (Yes at S710), the route calculating section 121 completes this route calculation process. This means that the route calculating section 121 denies the path setting request for setting the new path A.

On the other hand, if there is still any path for which the determination of availability of the route rearrangement is not carried out yet, the route calculating section 121 returns to S704 (No at S710).

Figure 8:
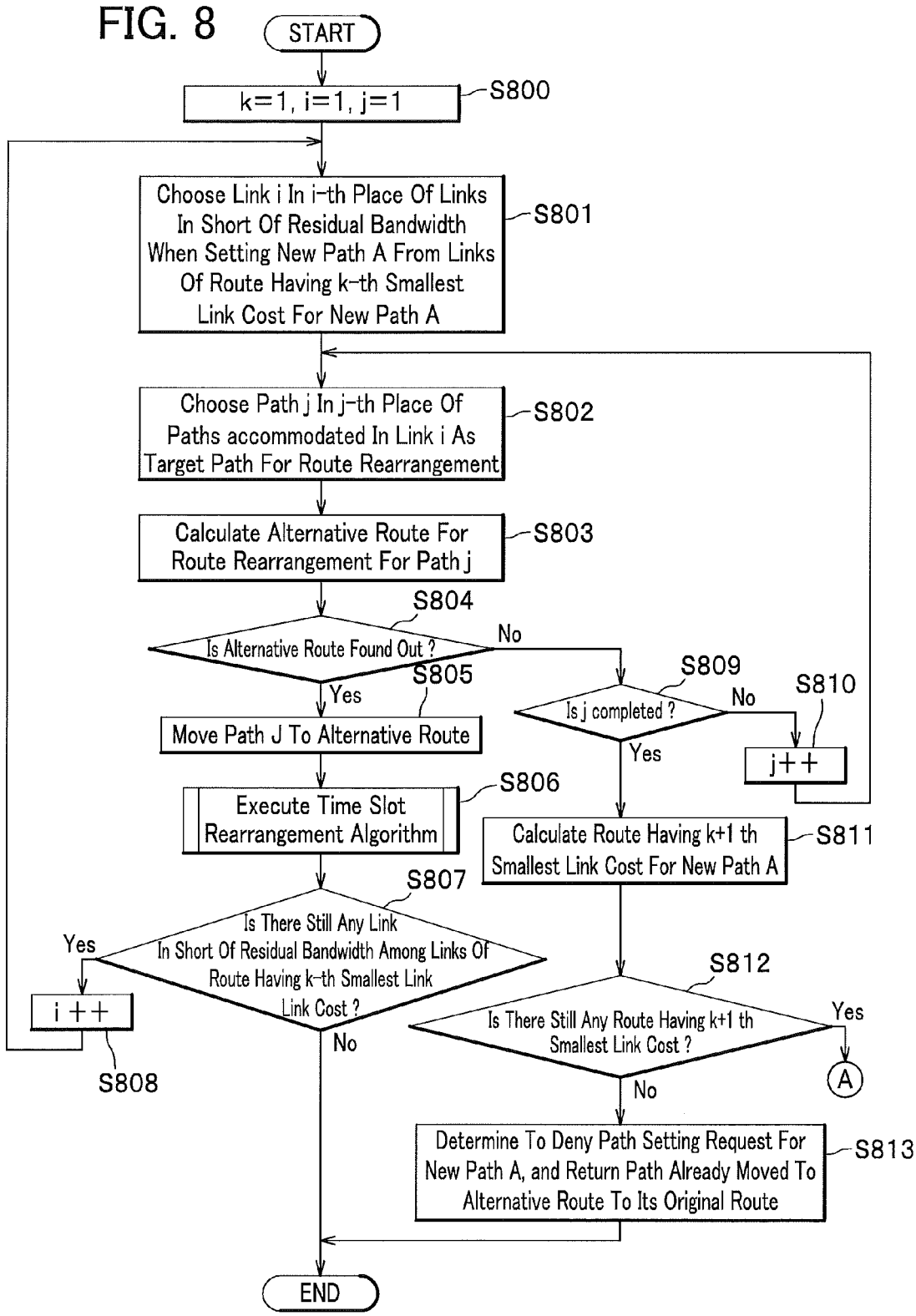
FIG. 8 is a flow chart showing the route arrangement process at S706 of FIG. 7.

Hereinafter, the route arrangement process at S706 will be explained in detail. FIG. 8 is a flow chart showing the route arrangement process at S706 of FIG. 7.

First, the route calculating section 121 defines k=1, i=1, j=1 for k, i, j which are parameters used in the route arrangement (S800).

Then, the route calculating section 121 choose a target route for the route rearrangement from candidate routes for the new path A, which are registered in the route information 133. Specifically, the route calculating section 121 chooses a route having the k-th smallest link cost from the candidate routes for the new path A, which are registered in the route information 133. The route calculating section 121 refers to the resource information 131 and chooses a link or links i in the i-th place of links which constitutes the above chosen route and also becomes in short of the residual bandwidth if the new path A is set (S801).

Then, the route calculating section 121 refers to the resource information 131, and chooses a target path for the route rearrangement from paths accommodated in the link i chosen at S801. Specifically, the route calculating section 121 chooses a path or paths j which is in the j-th place of the paths accommodated in the link i, as the target path for the route rearrangement (S802). The target path for the route rearrangement chosen by the route calculating section 121 may be chosen from the advance reserved paths alone, or from both the advance reserved paths and the working paths.

Next, the route calculating section 121 calculates an alternative route for the route rearrangement for the path j chosen at S802 (S803). Specifically, the route calculating section 121 searches the route information 133 for a route as a destination where this target path for the route rearrangement will be moved. With reference to the path reservation information 134, etc., the route calculating section 121 checks a bandwidth and a period of use (start date of use and end date of use) of the target path for the route arrangement; and with reference to the resource information 131, the route calculating section 121 also checks a reservation status of this searched route in the resource information 131, and then determines whether or not the period of use and the bandwidth of the target path can be secured in this searched route.

At this time, if the route calculating section 121 finds out an alternative route for the path j for the route rearrangement (Yes at S804), the route calculating section 121 moves the path j to this found alternative route (S805). Specifically, if the route calculating section 121 determines that the bandwidth for the path j during its period of use can be secured in this found alternative route, the route calculating section 121 chooses this alternative route as an alternative route for the path j, and then updates the reserved resource (period of use and bandwidth) of the path j in the resource information 131. If the path j is scheduled to be set in a predetermined time cycle, other paths in association with the path j may also be moved together to the destination.

Moving the path j to the destination route, if the time slot rearrangement may is required in the links of the destination route (alternative route), the time slot rearrangement can be executed. In other words, the route calculating section 121 executes the time slot rearrangement algorithm (S806). The time slot rearrangement denotes: to change a time slot allocated to a working path or an advance reserved path of a link of interest so as to secure an available bandwidth in the link of interest. The time slot arrangement algorithm will be described in detail later on, with reference to FIG. 9 and FIG. 10.

After the process at S806, if there is still any link having shortage of a residual bandwidth among the links of the route having the k-th smallest link cost for the new path A (Yes at S807), the route calculating section 121 increments "i" (S808), and returns to S801.

On the other hand, after the process at S806, if there is no link having shortage of a residual bandwidth among the links of the route having the k-th smallest link cost for the new path A (No at S807), the route calculating section 121 completes this calculation process.

At S804, if the route calculating section 121 finds out no alternative route for the route rearrangement of the path j (No at S804), and if the process is completed for every path j in the link i (Yes at S809), the route calculating section 121 then calculates a route having the k+1 th smallest link cost for the new path A (S811). Specifically, the route calculating section 121 finds out a route having the next smallest link cost among candidate routes for the path A in the route information 133. At this time, if there is found out any route having the k+1th smallest link cost for the new path A (Yes at S812), the route calculating section 121 returns to S707 of FIG. 7 and set the new path A to this found route. On the other hand, if there is no route having the k+1th smallest cost link for the path A (No at S812), the route calculating section 121 determines that the path setting request for setting the new path A should be denied at this step; and if there is a path that has been moved to an alternative route at S805, the route calculating section 121 brings this path to its original route (S813). Then the route calculating section 121 completes the process.

On the other hand, the process is not completed for every path j in the link i at S809 (No at S809), the route calculating section 121 increments "j" (S810) and then returns to S802.

Figure 9:
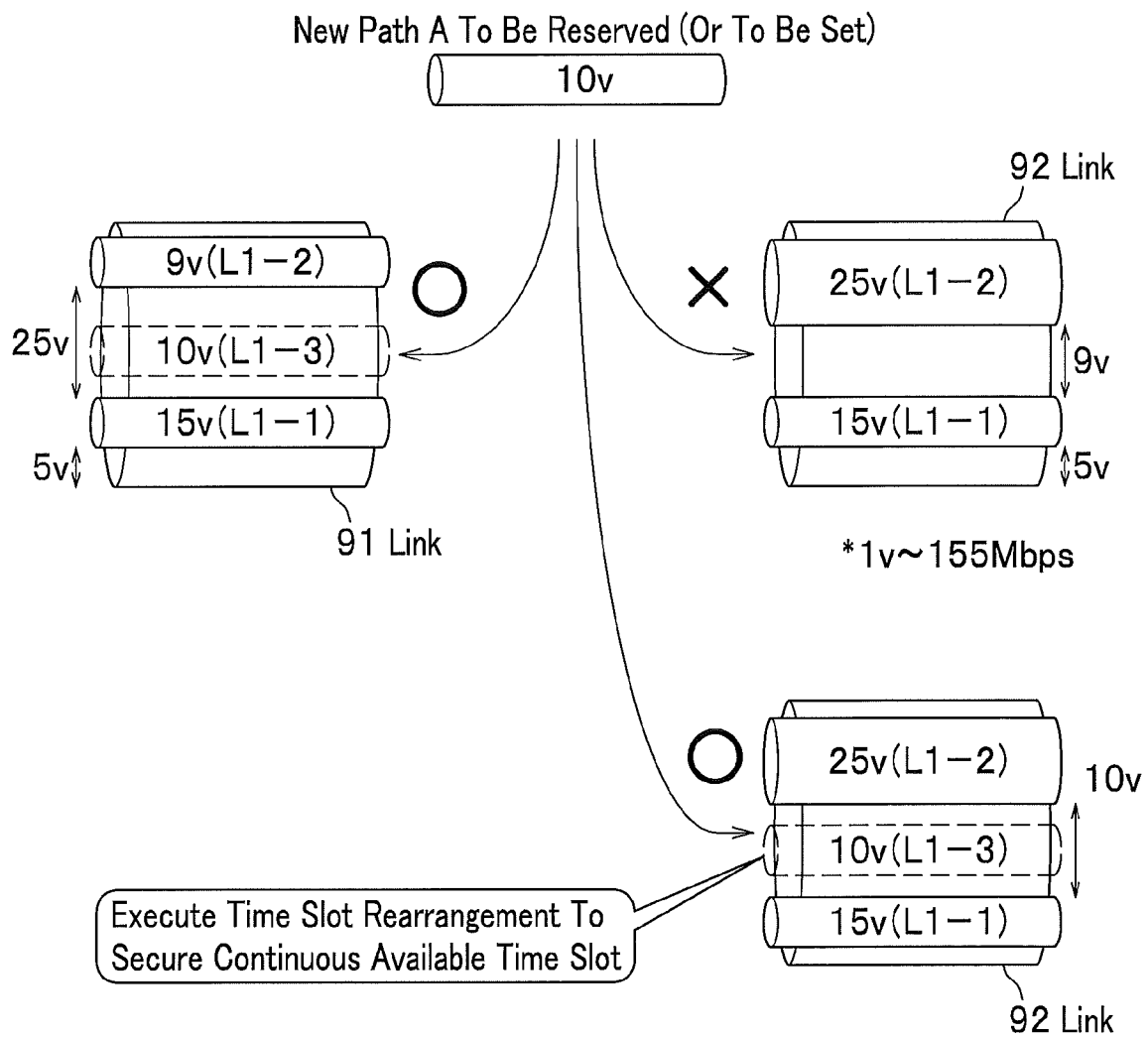
FIG. 9 is a drawing conceptually explaining the time slot rearrangement according to the present embodiment.
Figure 10:
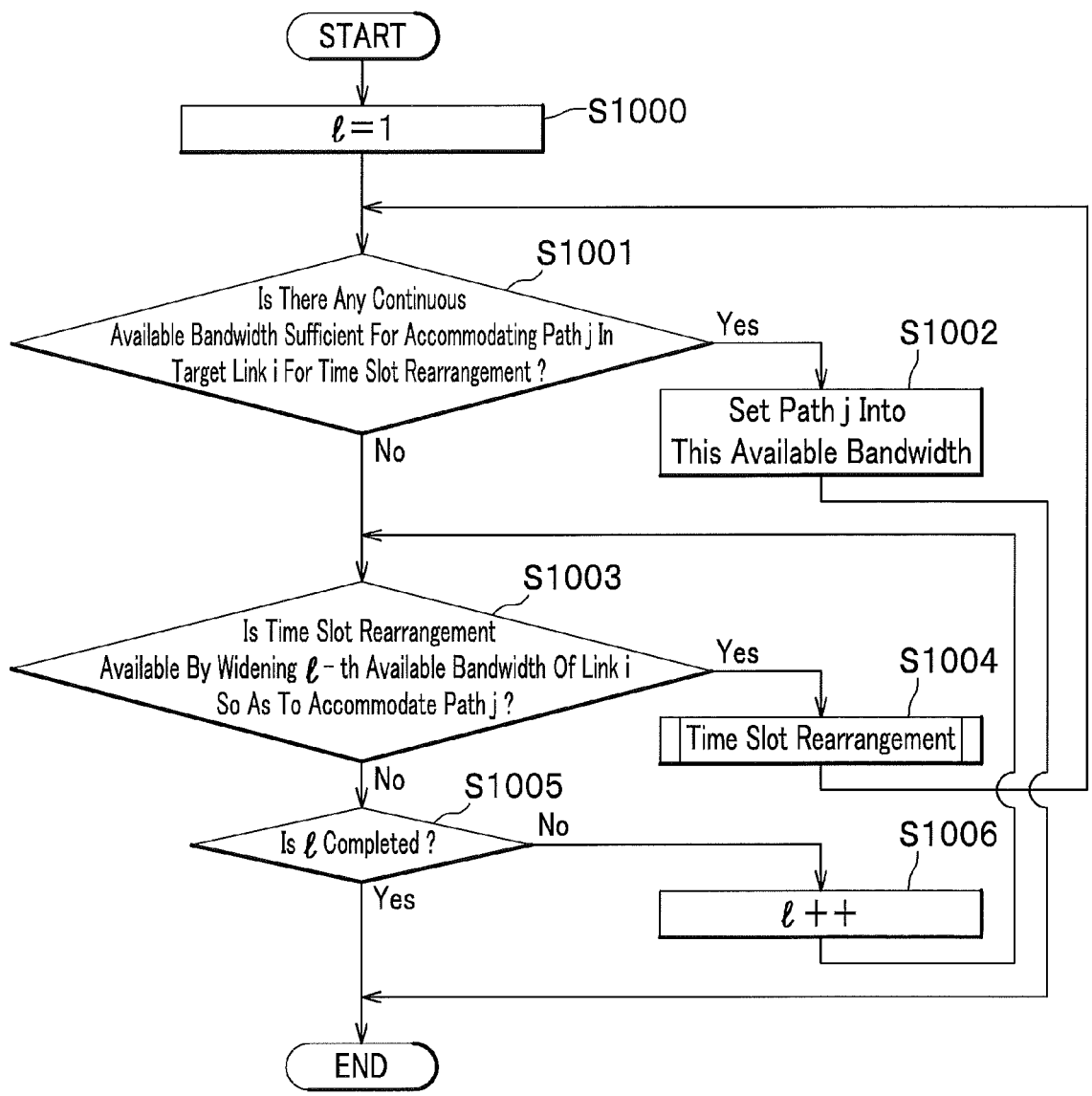
FIG. 10 is a flow chart showing the process of executing the time slot rearrangement algorithm at S806 of FIG. 8.

With reference to FIG. 9 and FIG. 10, how to execute the time slot rearrangement algorithm at S806 of FIG. 8 will be described hereinafter. FIG. 9 is a drawing conceptually explaining the time slot rearrangement according to the present embodiment. FIG. 10 is a flow chart showing the process of executing the time slot rearrangement algorithm at S806 of FIG. 8.

First, the time slot rearrangement according to the present embodiment will be explained with reference to FIG. 9. The "time slot rearrangement" herein denotes: to secure a continuous available bandwidth for this new path A by rearranging time slots currently used for other paths if there is no time slot sufficient for securing a continuous bandwidth in a link of interest, which is requested for a new path A to be reserved (or to be set). For example, as shown in FIG. 9, a new path A requires 10 v (1 v=155 Mbps), and if there is a continuous available time slot sufficient for securing the bandwidth (10 v) for this path A, such as an available time slot between a path of 9 v (L1-2) and a path of 15 v (L1-1) in the link 91, this available time slot can be allocated to the path A. To the contrary, if there is no continuous available time slot sufficient for securing a bandwidth for the path A (10 v), such as an available slot between the path of 25 v (L1-2) and the path of 15 v (L1-1) in the link 92, the time slot used for the path of 15 v (L1-1) is moved to another time slot at a lower portion of the link 92 so as to secure a continuous available time slot as much as the bandwidth of the new path A (10 v). Then, the new path A is allocated to this available time slot.

Specifically, as shown in the flow chart of FIG. 10, the route calculating section 121 sets "l" as "l=1"; this "l" is a parameter used for the time slot rearrangement. If there is a continuous available bandwidth sufficient for accommodating the path j in the target link i for the time slot rearrangement (Yes at S1001), the route calculating section 121 sets the path j into this available bandwidth (S1002). This means that the path j is allocated to the time slot having an available bandwidth.

On the other hand, if there is no continuous available bandwidth sufficient for accommodating the path j in the target link i for the time slot rearrangement (No at S1001), the route calculating section 121 determines whether or not the time slot rearrangement is available if the l-th available bandwidth of the link i is widened so as to accommodate the path j therein (S1003). If the route calculating section 121 determines that the time slot rearrangement is available by widening the l-th available bandwidth of the link i so that the path j can be accommodated (Yes at S1003), the route calculating section 121 performs this time slot rearrangement to widen the l-th available bandwidth of the link i, where the path j can be accommodated therein (S1004). This means that the route calculating section 121 secures a continuous available bandwidth greater than or equal to the bandwidth requested in the path setting request for the advance reserved path in the link i. Then the route calculating section 121 returns to S1001.

On the other hand, if the route calculating section 121 determines that the time slot rearrangement is unavailable by widening the l-th available bandwidth of the link i so as to accommodate the path j therein (No at S1003), and if the above process is completed for every l available bandwidth (Yes at S1005), the time slot rearrangement algorithm is completed. If the above process is not completed for every available bandwidth yet (No at S1005), the route calculating section 121 increments "l" (S1006), and then returns to S1003.

The route calculating section 121 performs the time slot rearrangement in the above manner. The route calculating section 121 updates the resource information 131 with the results from the time slot rearrangement performed in the above manner.

The route calculating section 121 may determine to or not to perform the time slot rearrangement algorithm depending on the determination of whether or not a period of use and a bandwidth requested for a new path A, etc exceeds a predetermined threshold. Alternatively, a target path to be rearranged through the time slot rearrangement may include an advance reserved path alone or both a working path and an advance reserved path.

In addition, either an available bandwidth between two paths of a target link for the time slot rearrangement or an available bandwidth between a path and one end of this target link can be widened. Specifically, an available bandwidth to be widened may be such an available bandwidth between two paths of the target link, or an available bandwidth at one end of the target link. Among available bandwidths in the target link, a largest available bandwidth may preferentially be widened first. In such a manner, it can be easier to secure a larger available bandwidth.

The above mentioned time slot rearrangement may include a scheme to consolidate available bandwidths dispersed across a target link into one.

Figure 11:
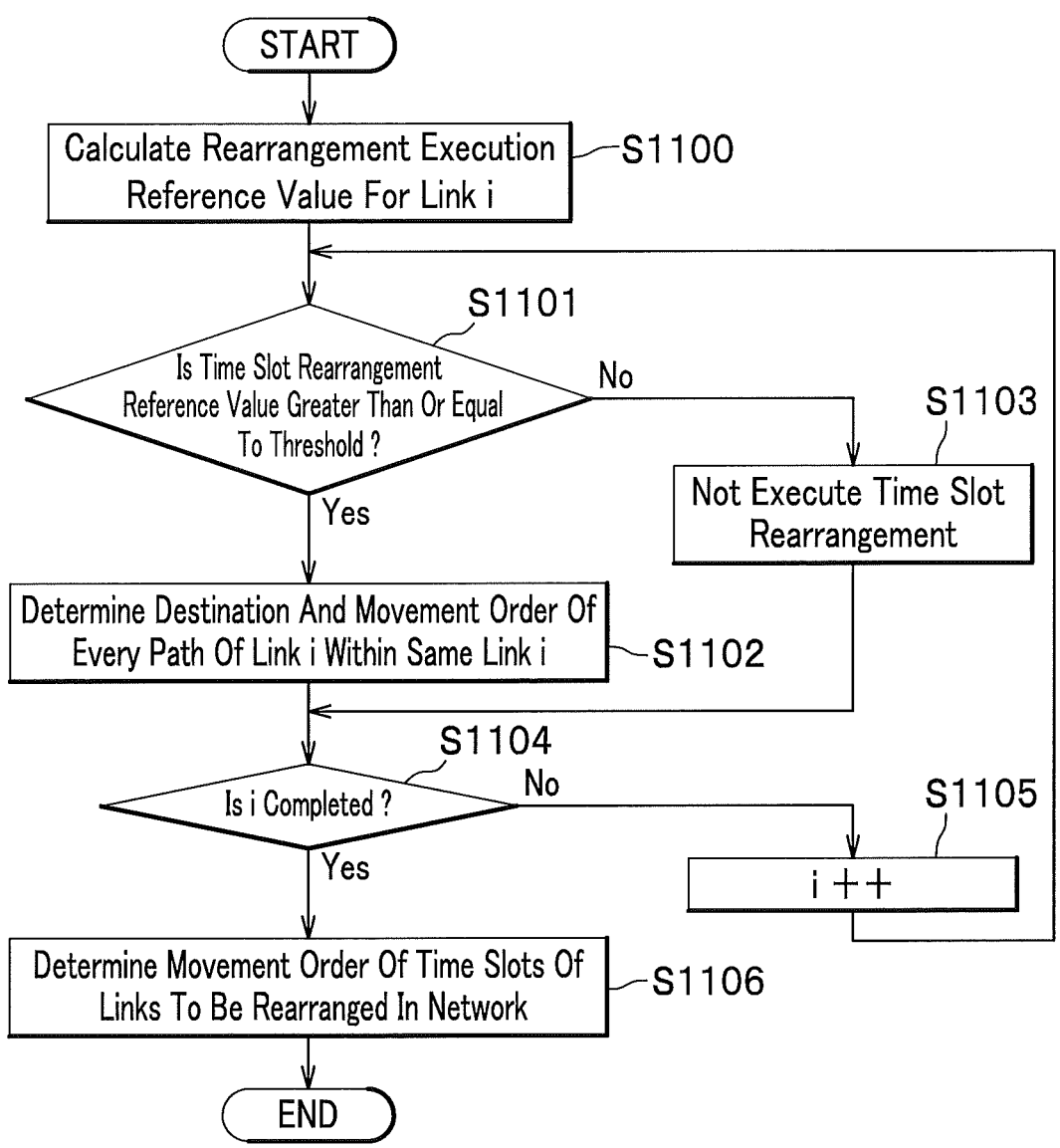
FIG. 11 is a flow chart showing the process steps of the time slot rearrangement according to the present embodiment.

The process steps of this scheme are described with reference to FIG. 11. FIG. 11 is a flow chart showing the process steps of the time slot rearrangement according to the present embodiment.

First, the route calculating section 121 calculates a rearrangement execution reference value for a target link (link i) for the time slot rearrangement (S1110). The rearrangement execution reference value may be a quantification indicating to what extent the time slot rearrangement is needed in another path in order to secure a bandwidth requested in a path setting request for setting a new path A, for example.

If the time slot rearrangement reference value calculated at S1110 is greater than or equal to a predetermined threshold (Yes at S1101), the route calculating section 121 determines a destination (time slot number as a destination) within the target link i for every path of the link i and the movement order of these paths to the destination (S1102). At this time, a destination of a path may be obtained by consolidating dispersed available bandwidths into one. For example, the route calculating section 121 determines the time slot numbers which indicate the respective destinations for the existing paths B, C, D in the target link i such that dispersed available bandwidths can be consolidated into one, as well as determining the movement order of the respective paths to their destinations. Then, the route calculating section 121 stores on a predetermined area of the storage 13 the time slot numbers of the respective destinations for these paths and their movement order.

For every link i, if the step of determining the destination of each path of the target link i within the same link i and the movement order of these paths is completed (Yes at S1104), the route calculating section 121 then determines the movement order of the time slots of the target links for the rearrangement in the network, as mentioned above (S1106). Specifically, for the links whose time slots are to be rearranged, the route calculating section 121 determines the execution order to execute from which link the time slot rearrangement is preferentially executed among these links. Then, the route calculating section 121 also stores the execution order in the storage unit 13 as well. The route calculating section 121 executes the time slot rearrangement of each link in the execution order stored on the storage unit 13. The movement order of the time slots may be defined depending on the ID numbers of the time slots in the descendant or ascendant order.

On the other hand, for every link i, if the step of determining the destination of each path of the target link i within the same link i and the movement order of these paths is not completed (No at S1104), the route calculating section 121 increments "i" (S1105) and then returns to S1101. If the time slot rearrangement reference value calculated at S1101 is smaller than the predetermined threshold (No at S1101), the route calculating section 121 does not execute the time slot rearrangement (S1103), and then proceeds to S1104.

In such a manner, the route calculating section 121 can perform the time slot rearrangement to consolidate available bandwidths dispersed across the target link into one. This time slot rearrangement can omit comparison of the above time slot rearrangement reference value to the predetermined threshold. The route calculating section 121 may execute the time slot rearrangement in different links that require the time slot rearrangement at a time. This can reduce time required for completing the entire time slot rearrangements through the network.

In such a time slot rearrangement scheme to consolidate available time slots in each link, the path management controller 1 may also determine whether or not the rearrangement execution reference value is greater than or equal to a predetermined threshold in a predetermined time interval, other than at the time of receiving a path setting request for setting a new path A, and to execute the time slot rearrangement if the rearrange execution reference value is equal to or greater than the predetermined threshold. Such a configuration enables the path management controller 1 to previously secure an available bandwidth sufficient for setting a new path A, so that the new path A can be set immediately when the path management controller 1 receives a path setting request for setting this new path A.

Figure 12:
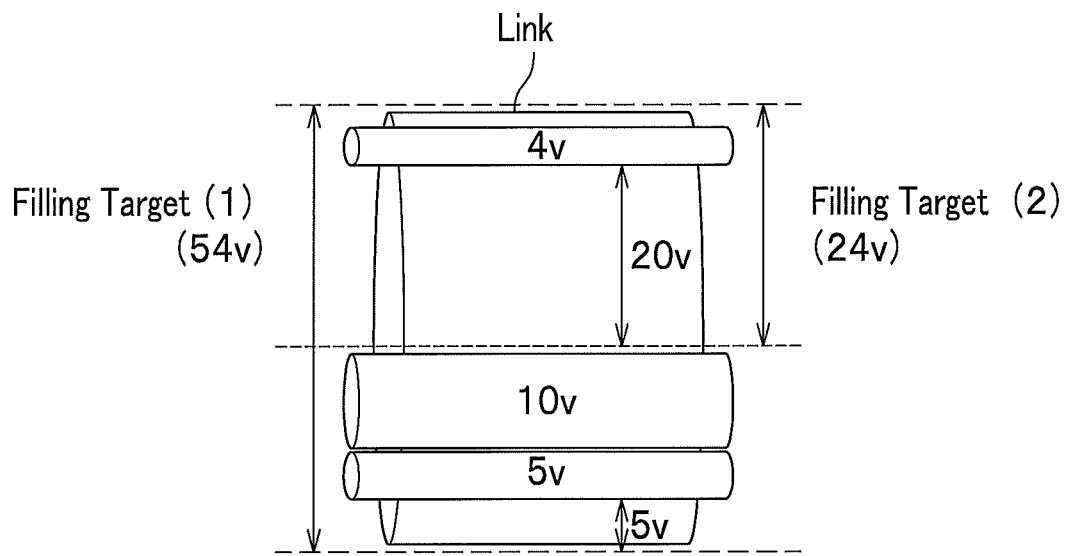
FIG. 12 explains an example of how to calculate the rearrangement execution reference value according to the present embodiment.

The above mentioned rearrangement execution reference value may be calculated based on a percentage of available bandwidths (or a filling percentage) of a target link of interest. There may be following two examples for explaining such a calculation. FIG. 12 explains an example of how to calculate the rearrangement execution reference value according to the present embodiment.

(1) For example, the route calculating section 121 may define the entire bandwidth (original bandwidth) of the target link of interest as a filling target, and calculates a percentage of an available bandwidth relative to this filling target. For example, the target link of interest has an entire bandwidth of 54 v (1 v=155 mbps), and if an available bandwidth is 20 v+5 v=25 v, the rearrangement execution reference value is 0.46. The route calculating section 121 may determine that the time slot rearrangement in the target link of interest should be executed if the above calculated value is greater than or equal to the predetermined threshold.

(2) Defining a time slot to be allocated for a new path A as a reference (position), the route calculating section 121 may define a bandwidth in an upper or a lower region (than this reference) as the filling target, and calculate a percentage of an available bandwidth relative to this filling target of this region. For example, now assuming that a time slot of 10 v of FIG. 12 is to be allocated for the new path A, and an available bandwidth relative to the bandwidth of the upper region (24 v) than this time slot is 20 v, the rearrangement execution reference value is 0.83. The route calculating section 121 may determine that the time slot rearrangement should be executed in the target link of interest if this rearrangement reference value is greater than or equal to the predetermined value.

At S801 of FIG. 8, when selecting target links for the route rearrangement, the route calculating section 121 may select some links among links which do not have a sufficient residual bandwidth for setting the path A in the order from a greater original bandwidth to a smaller original bandwidth or from a smaller original bandwidth to a greater original bandwidth, with reference to the resource information 131. If the route calculating section 121 selects target links in the order from a greater original bandwidth to a smaller original bandwidth, there is a higher possibility to secure a greater original bandwidth in these target links, so that a probability to deny a path setting request can be lower even if a greater bandwidth is requested in a path setting request of setting an advance reserved path. On the other hand, if the route calculating section 121 selects target links among the links in the order from a smaller original bandwidth to a greater original bandwidth, since paths having a smaller original bandwidth are likely to be accommodated in links having a smaller original bandwidth, it becomes easier for the route calculating section 121 to find out an alternative route for setting a new path A. Accordingly, a probability to deny a path setting request can be lower.

The route calculating section 121 may also receive in advance a selection input to select target links among the links in the order from a greater original bandwidth to a smaller original bandwidth or from a smaller original bandwidth to a greater original bandwidth, and then the path management controller 1 determines the selection order of the target links based on this input. Alternatively, the path management controller 1 may automatically refer to a bandwidth requested in a path setting request for setting the new path A and to select target links when receiving this path setting request. For example, the route calculating section 121 may select target links among the links in the order from a greater original bandwidth to a smaller original bandwidth if a relatively greater bandwidth is requested for the new path A: or may select target links among the links in the order from a smaller original bandwidth to a greater original bandwidth if a relatively smaller bandwidth is requested for the new path A.

At S802 of FIG. 8, the route calculating section 121 may select target paths for the route rearrangement among paths accommodated in a link i in the order from a greater bandwidth to a smaller greater bandwidth or from a smaller bandwidth to a greater bandwidth, as allocated to each target path indicated in the resource information 131. Or, the route calculating section 121 may select target paths among the paths in the order from a longer period of time to a shorter bandwidth or from a shorter period of time to a longer period of time, indicated in the path reservation information 134. If the route calculating section 121 selects target paths for the route rearrangement in the order from a greater period of time to a smaller period of time, it is possible to secure a greater available bandwidth in a link i, so that the probability to deny a path setting request for setting an advance reserved path requiring a greater bandwidth can be lower. On the other hand, if the route calculating section 121 selects target paths for the route rearrangement among the paths in the order from a smaller bandwidth to a greater bandwidth, an alternative route for this new path A can be easily found out, so that the probability to deny a path setting request for setting an advance reserved path can be lower. If paths having a longer period of use are selected as target paths for the route rearrangement, an available bandwidth having a longer period of use can be easily secured, so that the probability to deny a path setting request for setting an advance reserved path that requests a relatively longer period of use can be lower. In addition, if paths having a shorter period of use are selected as target paths for the route rearrangement, the route calculating section 121 can easily find out alternative routes for such target paths, so that the probability to deny a path setting request for setting an advance reserved path can be lower.

When selecting target paths for the route rearrangement, the route calculating section 121 may receive in advance an input of the path selection order, such as selecting target paths in a target link of interest in the order from a greater bandwidth to a smaller bandwidth or from a smaller bandwidth to a greater bandwidth, or in the order from a longer period of use to a shorter period of use or from a shorter period of use to a longer period of use, and the path management controller 1 may determine the path selection order to select target paths based on this input. When receiving a path setting request for setting a new path A, the path management controller 1 may refer to a bandwidth and a period of use requested for the new path A, and then determine which path selection order should be used when selecting target paths in an automatic manner. For example, if a relatively greater bandwidth is requested for setting a new path A, the route calculating section 121 selects target paths in the order from a greater bandwidth; and if a relatively smaller bandwidth is requested for setting a new path A, the route calculating section 121 selects target paths in the order from a smaller bandwidth; and if a relatively longer period of use is requested for setting a new path A, the route calculating section 121 selects target paths in the order from a longer period of use, and if a relatively shorter period of use is requested for setting a new path A, the route calculating section 121 selects target paths in the order from a shorter period of use.

When selecting available time slots in a link as a destination for accommodating a new path A, the route calculating section 121 may (preferentially) select time slots in the order from a smaller identification number to a greater identification number or from a greater identification number to a smaller identification number. With this time slot selection order, available time slots can be secured in the link from an end region of the link, so that a continuous available bandwidth can be easily secured when setting the new path A. When selecting available time slots in a target link as a destination for accommodating the new path A, the route calculating section 121 may select available time slots in the order from a smaller identification number or from a greater identification number, indicated in the resource information 131 as the period of use requested for the new path A is longer. With this time slot selection order, a time slot closer to an end region of the link is allocated to a path having a longer period of use, so that a further route rearrangement is less likely to be required after this time slot rearrangement.

In a case in which a new path is set through plural domains of the network (domain network), if an alternative route calculation (i.e. route rearrangement) or a time slot rearrangement (hereinafter both the rearrangements are also referred to just as a "rearrangement") is required for an advance reserved path or a working path already set in its own domain when setting such a new path A, the path management controller 1 may inform other path management controllers included in other domains of path IDs of target paths in which such an rearrangement is required. When transmitting and receiving a path setting request for setting a new path A and a path ID of a path in which an rearrangement is required across plural path management controllers, this transmitting or receiving may be carried out via a router 20 or via a network (not shown) that connects these plural path management controllers.

Figure 13:
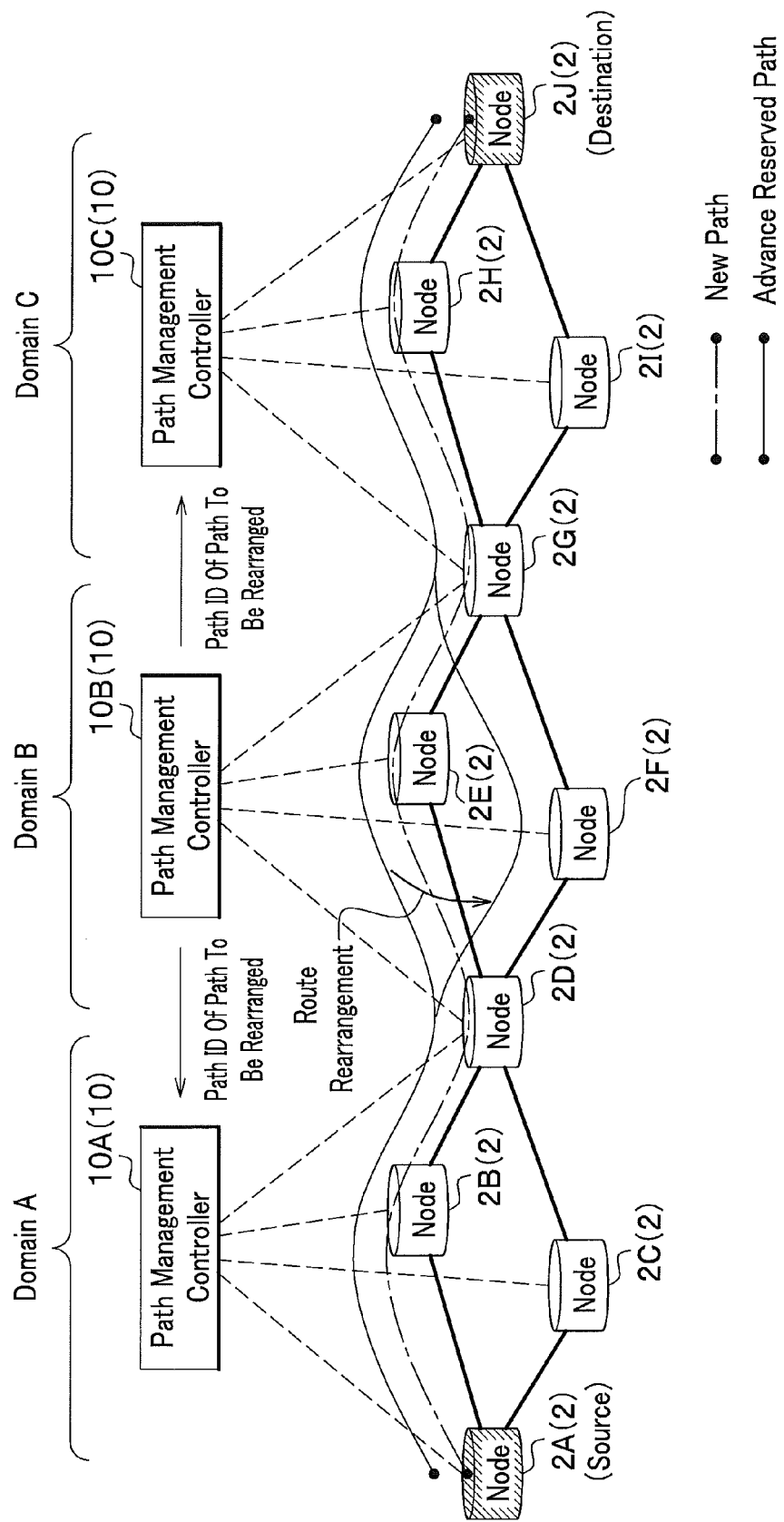
FIG. 13 is a drawing showing an outline of operations of the path management controller when setting a new path A across plural domains.

FIG. 13 shows an outline of operations of the path management controller when setting a new path A across plural domains. An Explanation will be provided using an example in which, in each of the domains A, B, C, the path management controller 10 (10A, 10B, 10C) is provided, and a new path A is set through these domains A, B, C. The domain A includes the nodes 2A, 2B, 2C, 2D, and the domain B includes the nodes 2D, 2E, 2F, 2G, and the domain C includes the nodes 2G, 2H, 2I, 2J. The path management controller 10 (10A, 10B, 10C) performs a route calculation for each segment, in order to set a new path (new path A) with the node 2A as a star point and the node 2J as a destination. If a rearrangement is required in an advance reserved path or a working path in its own domain when setting the new path, the management controller 10 informs the other path management controllers 10 of a path ID of this target path in which the rearrangement is required. How to perform the route calculation by the path management controller 10 has already been descried, therefore an explanation thereof is omitted now.

For example, as shown in FIG. 13, as a result of the route calculation, the route rearrangement is required in the domain B, and the path management controller 10B of the domain B informs the path management controllers 10A and 10C of a path ID of the target path to be rearranged, which is also accommodated in the path management controllers 10A and 10C. Thus the management controllers 10A and 10C are notified in advance that the rearrangement will be executed in a domain other than their own domains.

Figure 14:
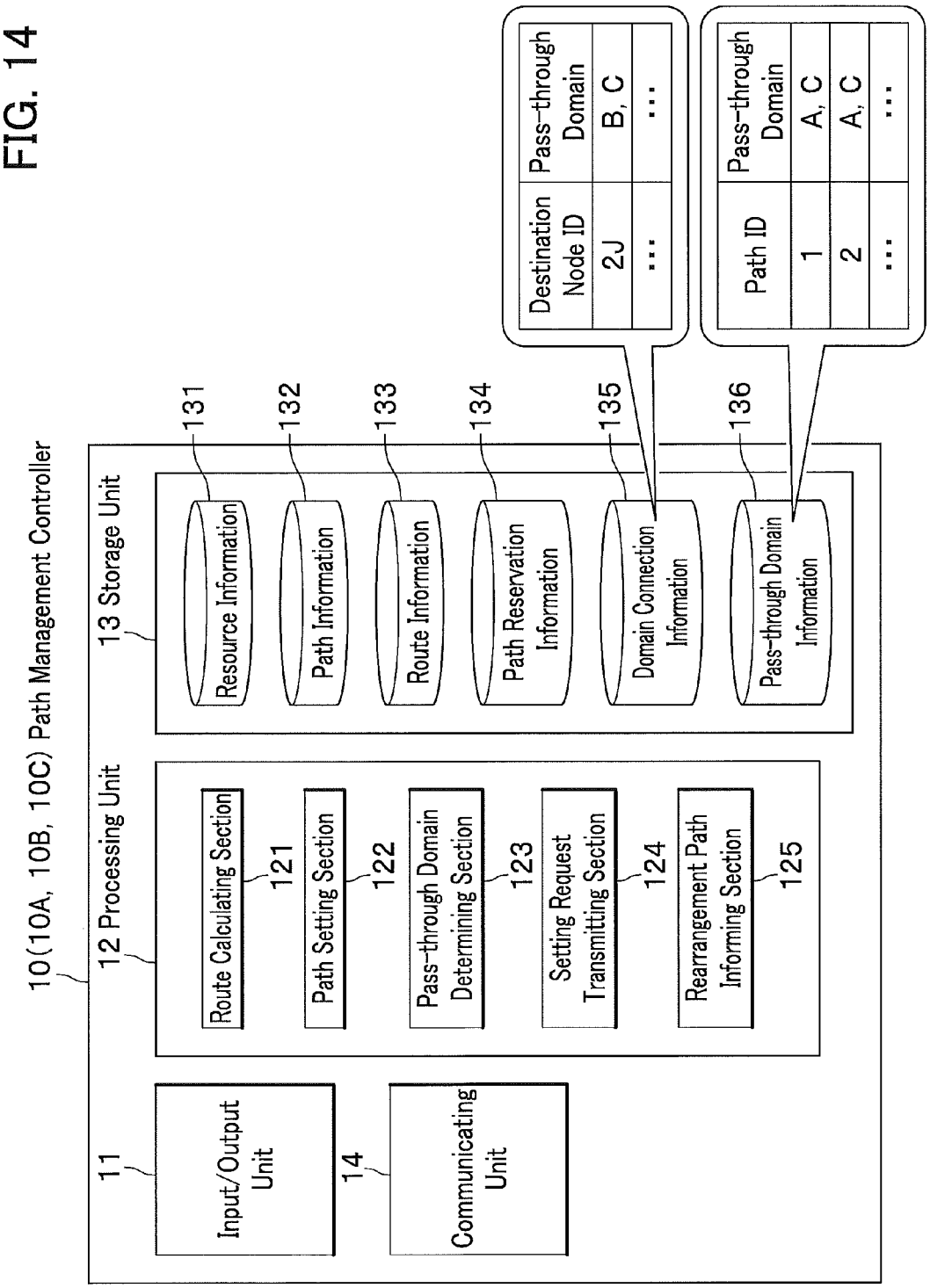
FIG. 14 is a block diagram showing the configuration of the path management controller of FIG. 13.

Next, with reference to FIG. 14, descriptions will be provided on a configuration of this path management controller 10. FIG. 14 is a block diagram showing the configuration of the path management controller 10 according to the present embodiment. Note that same numerical references are used for similar components to those descried in the above descriptions of the present embodiment, and detailed descriptions are omitted. As shown in FIG. 14, the processing unit 12 of the path management controller 10 of FIG. 2 further includes a pass-through domain determining section 123, a setting request transmitting section 124 and a rearrangement path informing section 125. The storage unit 13 of the path management controller 10 further includes domain connection information 135 and a pass-through domain information 136. The path management controller 10 stores domain identification information regarding its own domain as well as address information regarding the other path management controllers included in the other domains in a predetermined area of the storage unit 13.

When receiving a path setting request for setting a new path A in the route calculating section 121, the pass-through domain determining section 123 determines domains through which the new path A passes with reference to a node ID of the node 2 serving as a destination of the new path A and the domain connection information 135 (described later).

The setting request transmitting section 124 sends a path setting request to the path management controllers 10 of the domains through which the new path A passes. This path setting request includes the node ID of the source node, the node ID of the destination node, a bandwidth requested for the new path A and identification information regarding target domains for the route calculation (i.e. domains through which the new path A passes), etc. If the path setting request includes identification information regarding domains other than its own domain, the setting request transmitting section 124 forwards this path setting request to the path management controllers 10 of these other domains whose identification information is included in the path setting request. Specifically, based on the identification information regarding domains included in the path setting request, this path setting request is relayed across the path management controllers 10 of the domains in which the setting of the new path is carried out, and the route calculation is performed in each path management controller 10 of these domains.

The rearrangement path informing section 125 sends the path setting request for setting the new path A including identification information of the pass-through domains for the new path A, which are determined by the pass-through domain determining section 123, to the path management controllers 10 of the above determined pass-through domains. When the path management controller 10 receives the path setting request for setting the new path A from the other path management controllers 10, the path management controller 10 instructs its own route calculating section 121 to calculate a route in its own domain. As a result of the route calculation by the route calculating section 121, if there is still any path in which the rearrangement is required, the path management controller 10 informs the other path management controllers 10 of the domains through which the path for the rearrangement passes of a path ID of this path for the rearrangement. The rearrangement informing section 125 determines domains through which the path for the rearrangement passes, with reference to the route domain information 136 (described later).

In association with every node ID of destination nodes of paths (destination node ID), the domain connection information 135 includes identification information regarding pass-through domains through which a path of interest passes. For example, the domain connection information 135 of FIG. 14 indicates that pass-through domains through which a path having its destination node 2J passes are the domains "B" and "C".

In association with every node ID of advance reserved paths and working paths, the pass-through domain information 136 includes identification information regarding pass-through domains through which a path of interest. For example, the pass-through domain information 136 of FIG. 14 represents a path having a path ID of "1" passes through the domains "A" and "C". Of all domains through which a path of interest passes, the identification information of the pass-through domains may include only identification information regarding other domains adjacent to its own domain to which its own path management controller 10 belongs, or may include identification information regarding all the other domains through which the path of interest passes.

Figure 15:
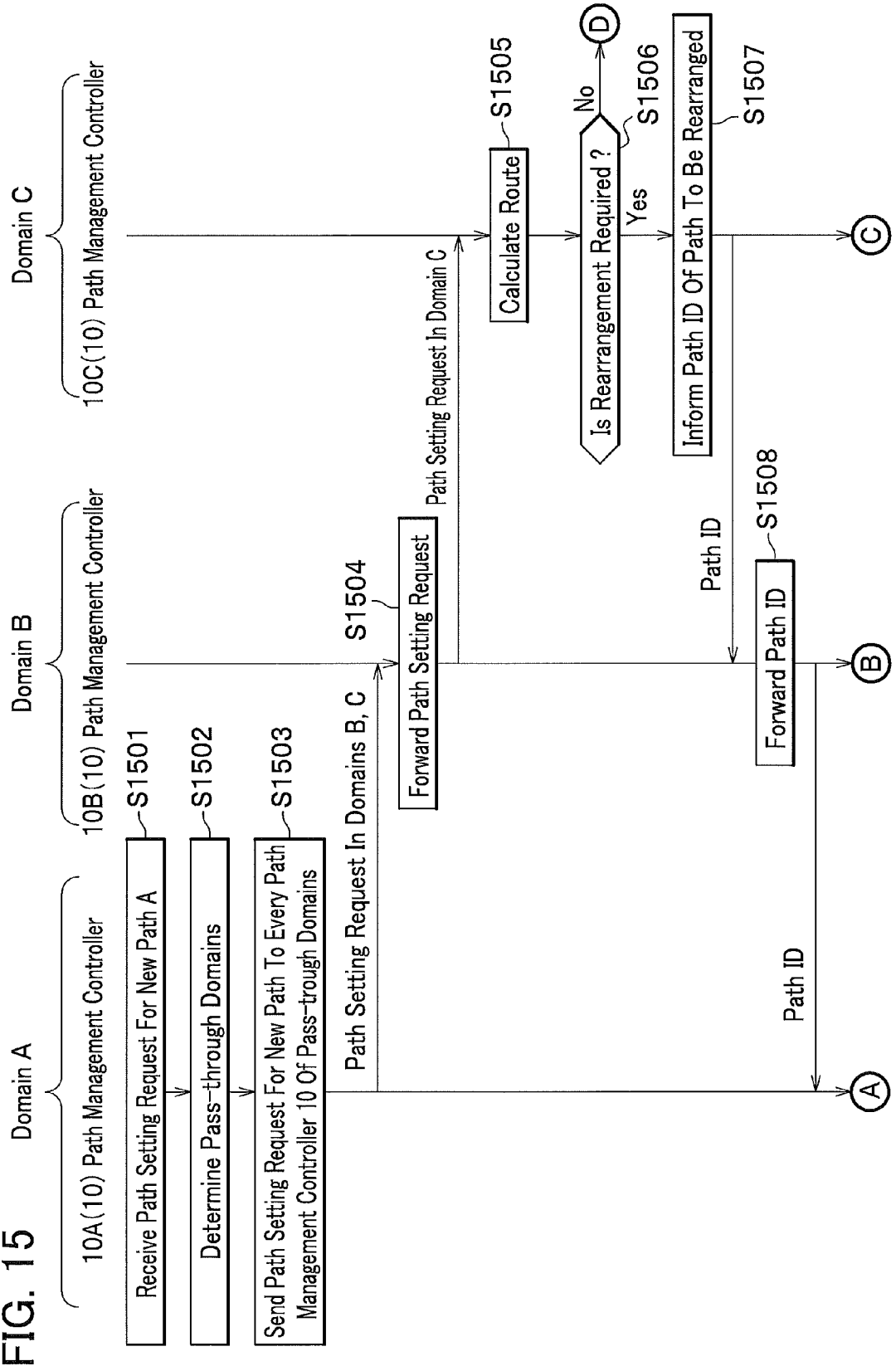
FIG. 15 is a flow chart showing the process steps of the path management controller of FIG. 14.
Figure 16:
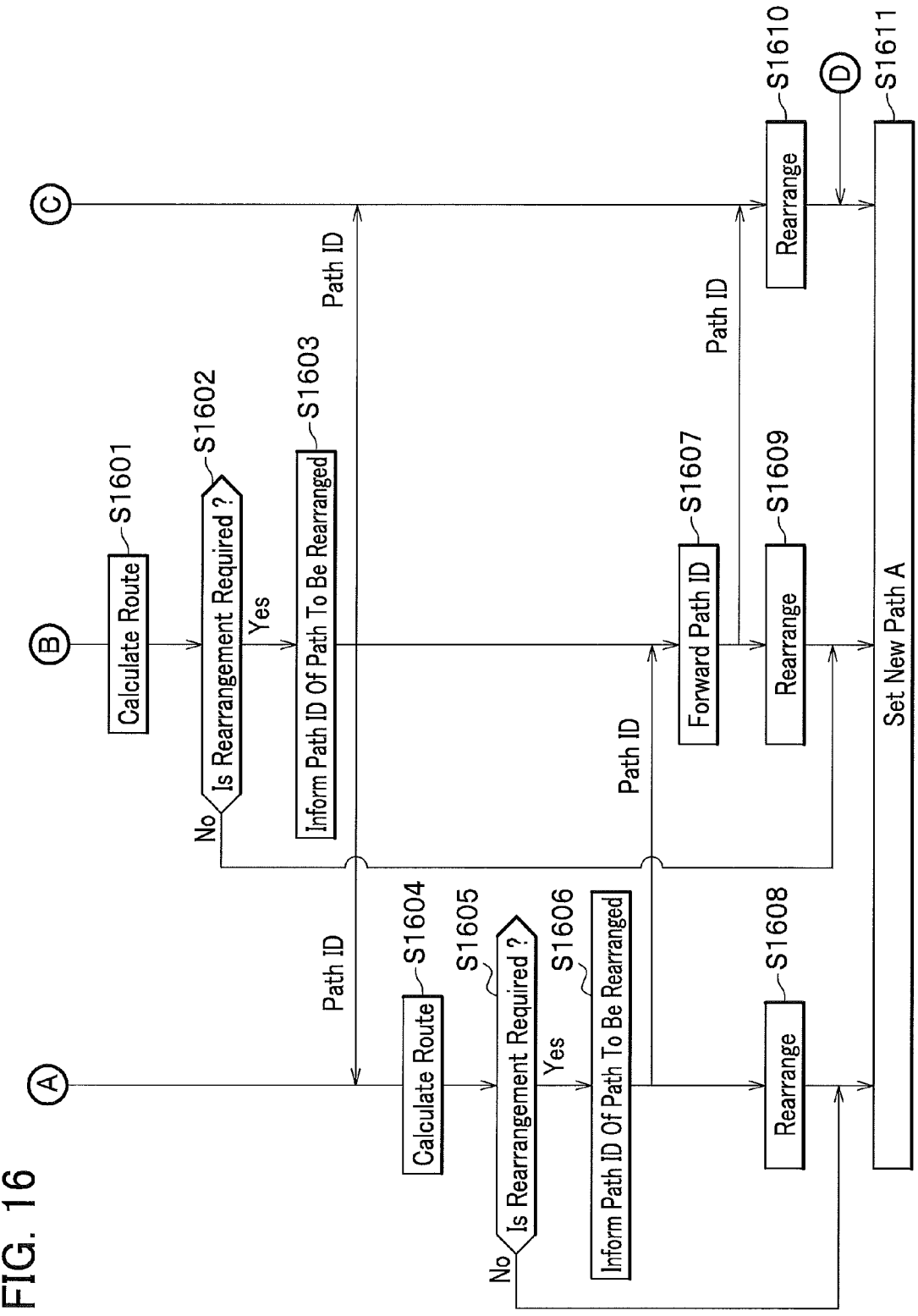
FIG. 16 is a flow chart showing the process steps of the path management controller of FIG. 14.

Next, the processing steps of the above mentioned path management controllers 10 will be explained with reference to FIGS. 15 and 16 hereinafter. The explanation is given using an example of setting the new path A of FIG. 13 whose source is the node 2A and whose destination is the node 2J. FIG. 15 and FIG. 16 are flow charts showing the process steps of the path management controller 10 of FIG. 14.

When the path management controller 10A receives a path setting request (setting instruction) for the new path A (S1501), the pass-through domain determining section 123 refers to the domain connection information 135 so as to determine domains through which the new path A having the node 2J as its destination passes when this new path A is set (S1502). For example, the pass-through domain determining section 123 determines that pass-through domains of the new path A whose destination is the node 2J are the domains "B" and "C".

Next, the rearrangement path informing section 125 sends the path setting request for setting the new path A from the setting request transmitting section 124 to every path management controller 10 of the pass-trough domains determined at S1502 (S1503). For example, if the pass-through domains are the domains B and C, the setting request transmitting section 124 sends a path setting request for setting the new path A in the domains B and C to the path management controller 10B.

The path management controller 10B (10) receives this path setting request. If identification information regarding a domain or domains other than its own domain is included in this path setting request, the rearrangement path informing section 125 of the path management controller 10B instructs its own setting request transmitting section 124 to forward this path setting request to the path management controller 10 of the domain other than its own domain. For example, if the path setting request includes identification information regarding the domain C, the setting request transmitting section 124 forwards this path setting request to the path management controller 10 (10C) of the domain C (S1504).

When the path management controller 10 (10C) receives this path setting request from another path management controller 10 (10B), and if the controller 10 (10C) determines that the node 2 (2J) serving as the destination of the new path A included in the path setting request is the node 2 of its own domain, its own rearrangement path informing section 125 instructs its own route calculating section 121 to calculate a route starting from the source domain from which this path setting request has originally been sent to the node 2 (2J) serving as the destination of the new path A (S1505). Then, this route calculating section 121 stores a result of this route calculation in the storage unit 13.

As a result of this route calculation by the route calculating section 121, if it is determined that the rearrangement is required (Yes at S1506), the rearrangement informing section 125 informs the path management controller 10 (such as the path management controller 10B) included in the domain through which a path to be rearranged passes of a path ID of this path for the rearrangement (S1507). To the contrary, As a result of this route calculation by the route calculating section 121, if it is determined that the rearrangement is not required (No at S1506), the process proceeds to S1611 of FIG. 16. Descriptions of S1611 will be described later on.

As shown in S1508, receiving the path ID of the path in which the rearrangement is required, the path management controller 10 (10B) may forward this path ID to the path management controller 10 (such as the path controller 10A) of another domain adjacent to its own domain if the path for the rearrangement passes through this adjacent domain. Specifically, it may be configured to relay a path ID of a path in which the rearrangement is required among the path management controllers of all domains through which the path where the rearrangement is required passes, so that this path ID can be informed to every concerned path management controller.

With reference to FIG. 16 again, after the step at S1508 (or after the step at S1504), based on the path setting request sent from the path management controller 10A at S1503, the rearrangement path informing section 125 of the path management controller 10B included in the domain B instructs the route calculating section 121 to perform a route calculation for a route connecting the domain A and the domain C so as to set the new path A (S1601). As a result of this route calculation by the route calculating section 121 of the path management controller 10B, if it is determined that the rearrangement is required (Yes at S1602), the rearrangement path informing section 125 informs the path management controllers 10 (such as the path management controllers 10A, 10C) included in the domains through which the path for the rearrangement passes of the path ID of this path (S1603). To the contrary, as a result of the route calculation by the route calculating section 121 of the path management controller 10B, if it is determined that the rearrangement is not required (No at S1602), the process proceeds to S1611.

After the step at S1503, the route calculating section 121 of the path management controller 10A performs a route calculation for a route connecting the node 2 (node 2A) as the source and the domain B for setting the new path A (S1604). Then, the result of this route calculation is stored in the storage unit 13. As a result of the route calculation by the route calculating section 121 of the path management controller 10A, if it is determined that the rearrangement is required (Yes at S1605), the rearrangement path informing section 125 informs the path management controller 10 (such as the path management controller 10B) of the domain through which the path for the rearrangement passes of the path ID of this path (S1606). To the contrary, as a result of the route calculation by the route calculating section 121, if it is determined that the rearrangement is not required (No at S1605), the process proceeds to S1611. After receiving the path ID, as similar to S1508 of FIG. 15, the path management controller 10B may forward this path ID to the path management controller 10 (such as the path controller 10C) of another domain adjacent to its own domain if the path for the rearrangement passes through this adjacent domain (S1607).

As such, the path management controller 10 determines that the rearrangement is required for setting the new path A as a result of the route calculation, and then the path management controller 10 executes the route rearrangement in its own domain (S1608, S1609, S1610). Specifically, the path management controller 10 updates the resource information 131 and the path reservation information 134 of its own storage unit 13 with information regarding the rearranged route. Thereafter, the respective path management controllers 10 (10A, 10B, 10C) set the new path A from the source node (node 2A) to the destination node (node 2J) (S1611).

For example, in the case that the rearrangement is required in the domain B among the domains A, B, C of FIG. 13, the path management controller 10B updates its own resource information 131 and path reservation information 134 with information regarding the rearranged route after rearranged. Then, each of the path management controllers (10A, 10B, 10C) instructs the node 2 of its own domain to execute the path setting, so as to set the new path A across the domains A, B, C.

In the present embodiment, if there is still any domain within which the rearrangement is required for a setting the new path A, the path management controller 10 (10A, 10B, 10C) may not perform the rearrangement within this concerned domain only, but once cancel the entire path to be rearranged, and then reset this path.

A path ID of a path in which the rearrangement is required is forwarded among the path management controllers 10 of domains through which this path passes, and eventually the path ID reaches the path management controller 10 (such as the path management controller 10A) of the domain serving as the source of this path in which the rearrangement is required. The path management controller 10 of the domain (such as the domain A) serving as the source of this path instructs every path management controller 10 of the domains (such as domains B, C) through which this path corresponding to the above path ID to cancel the setting of this entire path, and then reset (re-reserve) this path. At this time, the domains through which this path passes are determined with reference to the pass-through domain information 136.

The path management controller 10 according to the present embodiment is embodied by using a path management control program that allows the path management controller 10 to execute the above mentioned process steps, and the program may be provided in a manner to be stored in a computer readable medium (CD-ROM). The program may also be provided through a network.

What is claimed is:

1. A path management controlling method using a path management controller comprising:
   an input/output unit for controlling input/output of various data;
   a storage unit for storing
   (1) route information including identification information regarding each link used for a path that connects nodes, (2) in association with the identification information of each link, resource information including identification information of advance reserved paths and working paths that use that link and a residual bandwidth of that link in chronological order, (3) in association with the identification information of each working path, path information including identification of links and a bandwidth used in the working path, and (4) in association with the identification information of each advance reserved path, path reservation information including a bandwidth used in that advance reserved path and a period of use of that advance reserved path;

a route calculating section for calculating a route for a new future reserved path with reference to the route information, the resource information, the path information and the path reservation information; and a path setting section for setting a path between each pair of nodes in a network, based on the path reservation information or a path setting request for setting a path, which is input via the input/output unit, wherein the path management controlling method that allows the path management controller to execute steps of:

via the input/output unit, receiving a path setting request for setting a new future reserved path, which includes a bandwidth and a period of use requested for the new future reserved path;

with reference to the route information and the resource information, calculating a route for the new future reserved path;

with reference to the residual bandwidth of each link at each time included in the chronologically ordered resource information, determining whether or not there is any link that cannot secure a bandwidth of the new future reserved path during the period of use as requested in the path setting request, among links of the route for the new future reserved path;

when determining that there is such link that cannot secure the bandwidth of the new future reserved path during the period of use as requested in the path setting request, among the links of the route for the new future reserved path, with reference to the route information and the resource information, calculating an alternative route for an already-reserved path that uses the such link that cannot secure the bandwidth of the new future reserved path as requested in the path setting request, among paths registered in the path information and the path reservation information, wherein the alternative route does not use the such link so that the new future reserved path can be reserved; and updating the resource information and the path reservation information with the calculated alternative route and the route for the new future reserved path, wherein, the resource information further includes information regarding an original bandwidth of every link, and if there are plural links that cannot secure the bandwidth during the period of use as requested in the path setting request, among the links in the calculated route for setting the advance reserved path, the method allows the path management controller to execute further steps of:

when calculating the alternative route for the path, receiving a selection input to select preferentially executing this alternative route calculation in the plural links in the order from a greater original bandwidth, or preferentially executing this alternative route calculation for the plural links in the order from a smaller original bandwidth; and when calculating the alternative route for the path, based on this received selection input, determining from which link among the plural links the alternative route for the path in the link of interest is preferentially calculated.

2. The path management controlling method as claimed in the claim 1, wherein, when setting the path, the method allows the path management controller to execute a further step of instructing each node to execute an operation of adding or deleting a path, or changing a bandwidth of the path in an uninterruptible manner.

3. The path management controlling method as claimed in the claim 1, wherein, if there are plural paths to be calculated for the alternative route in the link of interest, the method allows the path management controller to execute further steps of:

receiving at least one of selection inputs to preferentially calculate the alternative route for the path among the plural paths to be calculated (1) in the order from a greater bandwidth or from a smaller bandwidth, and (2) in the order from a longer period of use or a shorter period of use; and based on the received selection input, with reference to the bandwidth and the period of use of the path of interest included in the path information and the path reservation information, determining from which path among the plural paths to be calculated, the alternative route for the path is preferentially calculated.

4. The path management controlling method as claimed in the claim 1, wherein, when calculating the alternative route for the path, the method allows the path management controller to execute a further step of executing the alternative route calculation, excluding links that do not have a residual bandwidth sufficient for the bandwidth of the path of interest, among links included in the resource information.

5. The path management controlling method as claimed in the claim 1, wherein, the path reservation information further includes information regarding a plurality of the advance reserved paths to be set in a predetermined time cycle, and the method allows the path management controller to execute a further step of:

if the path to be calculated for the alternative route calculation is included in the plurality of the advance reserved paths, calculating the alternative route such that all the plurality of the advance reserved paths pass a same route, and updating the path reservation information and the resource information with the calculated alternative route.

6. The path management controlling method as claimed in the claim 1, wherein, the resource information includes identification information regarding time slots of the link of interest allocated to the working paths and the advance reserved paths, and the method allows the path management controller to execute further steps of:

referring to a residual bandwidth in association with every link at each time included in the resource information, and if determining that the link of interest has a residual bandwidth greater than or equal to a bandwidth during the period of use as requested in the path setting request, but has no continuous available bandwidth greater than or equal to a bandwidth as requested in the path setting request;

executing a time slot rearrangement to change a time slot allocated to the working path or the advance reserved path in the link of interest, so as to secure in this link of interest the continuous available bandwidth greater than or equal to a bandwidth as requested in the path setting request;

allocating the time slot having the secured continuous available bandwidth to the advance reserved path; and updating the resource information with the identification information regarding the time slot allocated to the advance reserved path as well as the identification information regarding the time slot of the working path or the advance reserved path, which has been changed with this time slot rearrangement.

7. The path management controlling method as claimed in the claim 6, wherein,
the method allows the path management controller to execute further steps of:
executing a time slot rearrangement to change a time slot allocated to the working path or the advance reserved path in the link of interest in a predetermined time cycle by widening an available bandwidth between two paths in the link of interest, or between one end and one path in the link of interest; and
updating the resource information with the identification information regarding the time slot of the working path or the advance reserved path, which has been changed with this time slot rearrangement.

8. The path management controlling method as claimed in the claim 6, wherein,
the method allows the path management controller to execute a further step of executing the time slot rearrangement to secure an available bandwidth in the link of interest, by preferentially widening a larger available bandwidth either between two paths in the link of interest or between one end and one path in the link of interest.

9. The path management controlling method as claimed in the claim 6, wherein,
the method allows the path management controller to execute further steps of
referring to a residual bandwidth in association with every link at each time included in the resource information; and
if determining that the link of interest has a residual bandwidth greater than or equal to a bandwidth during the period of use as requested in the path setting request, but has no continuous available bandwidth greater than or equal to a bandwidth as requested in the path setting request, and at least either of the period of use and the bandwidth as requested in the path setting request exceeds a predetermined threshold, executing the time slot rearrangement in the link of interest.

10. The path management controlling method as claimed in the claim 6, wherein,
when executing the time slot rearrangement to secure a continuous available bandwidth greater than or equal to a bandwidth as requested in the path setting request, the method allows the path management controller to execute a further step of consolidating the available bandwidth between two paths in the link of interest or the available bandwidth between one end and one path in the link of interest.

11. The path management controlling method as claimed in the claim 10, wherein,
the method allows the path management controller to execute further steps of:
referring to a residual bandwidth in association with every link at each time included in the resource information as well as a bandwidth allocated to each time slot; and
if determining that the link of interest has a residual bandwidth greater than or equal to a bandwidth during the period of use as requested in the path setting request, but has no continuous available bandwidth greater than or equal to a bandwidth as requested in the path setting request, and the available bandwidth of the link of interest exceeds a predetermined threshold, executing the time slot rearrangement in the link of interest.

12. The path management controlling method as claimed in the claim 6, wherein
the method allows the path management controller to execute a further step of, if there are plural links to be calculated for the time slot rearrangement, executing the time slot rearrangement in each of the links at a time.

13. The path management controlling method as claimed in the claim 1, wherein
the resource information further includes identification information regarding every time slot constituting the link of interest, and
the method allows the path management controller to execute a further step of, when setting the advance reserved path, referring to the resource information, and preferentially selecting one from available time slots in the link of interest as a destination for setting the advance reserved path, in the order from a smallest identification number or from a greatest identification number, so as to set the advance reserved path into this selected time slot.

14. The path management controlling method as claimed in the claim 13, wherein,
when selecting one from available time slots of the link of interest as a destination for setting the advance reserved path, the method allows the path management controller to execute a further step of referring to the resource information, and selecting one from available time slots having a smaller or greater identification number thereof as the period of use of the advance reserved path is longer.

15. The path management controlling method as claimed in the claim 1, wherein,
the path setting request for setting the advance reserved path is a path setting request for setting an immediate-use path to be used immediately.

16. A non-transitory computer-readable storage medium storing a path management control program that instructs a path management controller comprising a computer to execute the steps of the path management control method as claimed in the claim 1.

17. A path management controller comprising:
an input/output unit for controlling input/output of various data;
a storage unit for storing
(1) route information including identification information regarding every link used for a path that connects nodes,
(2) in association with identification information of every link, resource information including identification information of advance reserved paths and working paths that use the link of interest and a residual bandwidth of the link of interest in chronological order, (3) in association with identification information of every working path, path information including identification of links and a bandwidth used in the working path of interest, and
(4) in association with identification information of every advance reserved path, path reservation information including a bandwidth used in the advance reserved path of interest and a period of use of the advance reserved path of interest;

a route calculating section for via the input/output unit, receiving a path setting request for setting the advance reserved path, which includes a bandwidth and a period of use requested for the advance reserved path, calculating a route to be used for the advance reserved path with reference to the route information and the resource information, with reference to a residual bandwidth in association with every link at each time included in the resource information, if determining that there is any link that cannot secure a bandwidth during the period of use as requested in the path setting request, among links used in the route for the advance reserved path, with reference to the route information and the resource information, calculating an alternative route for a path that uses the link that cannot secure the bandwidth requested in the path setting request, among paths registered in the path information and the path reservation information, and updating the resource information and the path reservation information with the calculated alternative route and route for the advance reserved path; and a path setting section for setting the advance reserved path having a bandwidth as represented in the path reservation information between each pair of nodes in a network during a period of use as represented in the path reservation information, wherein, the resource information further includes information regarding an original bandwidth of every link, and if there are plural links that cannot secure the bandwidth during the period of use as requested in the path setting request, among the links in the calculated route for setting the advance reserved path, the path management controller is further configured to execute:

when calculating the alternative route for the path, receiving a selection input to select preferentially executing this alternative route calculation in the plural links in the order from a greater original bandwidth, or preferentially executing this alternative route calculation for the plural links in the order from a smaller original bandwidth; and when calculating the alternative route for the path, based on this received selection input, determining from which link among the plural links the alternative route for the path in the link of interest is preferentially calculated.

18. A path management control system comprising:
the path management controller as claimed in the claim 17; and
nodes between two of which a path is set in response to a path setting instruction sent from this path management controller.

19. The path management controller as claimed in the claim 17 wherein,
the path management controller is used in a network including plural domains each of which comprises the path management controller and a node, wherein a path is set between this node and another node in response to a path setting instruction sent from the path management controller,
the storage unit further comprises:
domain connection information including identification information regarding pass-through domains through which a path having this node as a destination thereof passes when setting this path, in association with identification information of every node; and
pass-through domain information including identification information regarding pass-through domains through which the path passes, in association with identification information regarding every advance reserved path and every working path,
and
the path management controller further comprises:
a pass-through domain determining section that, when receiving a path setting request for setting the advance reserved path, determines pass-through domains through which the advance reserved path passes when setting this advance reserved path, with reference to identification information regarding the node serving as the destination of the advance reserved path and the domain connection information; and
a rearrangement path informing section that
sends the path setting request for setting the advance reserved path, including identification information regarding the pass-through domains to other path management controllers of the determined pass-through domains,
when receiving the path setting request for setting the advance reserved path from one of the other path management controllers, instructs the route calculating section of its own path management controller to calculate a route for the advance reserved path in its own domain,
based on results of the route calculation by the route calculating section, if there is still any link that cannot secure a bandwidth during the period of use, as requested in the path setting request, and there is a path in which the alternative route is calculated among paths that use this link, determines domains through which this path passes, with reference to the pass-through domain information, and
informs a path ID of this path to the path management controllers of the determined pass-through domains.

* * * * *